United States Patent [19]

Cozewith et al.

[11] Patent Number: 4,882,406

[45] Date of Patent: * Nov. 21, 1989

[54] NODULAR COPOLYMERS FORMED OF ALPHA-OLEFIN COPOLYMERS COUPLED BY NON-CONJUGATED DIENES

[75] Inventors: Charles Cozewith, Westfield; Shiaw Ju, Edison; Gary W. Verstrate, Matawan, all of N.J.

[73] Assignee: Exxon Research & Engineering Company, Florham Park, N.J.

[*] Notice: The portion of the term of this patent subsequent to Dec. 29, 2004 has been disclaimed.

[21] Appl. No.: 813,511

[22] PCT Filed: Dec. 16, 1985

[86] PCT No.: PCT/US85/02529

§ 371 Date: Mar. 5, 1986

§ 102(e) Date: Mar. 5, 1986

[87] PCT Pub. No.: WO86/03755

PCT Pub. Date: Jul. 3, 1986

Related U.S. Application Data

[63] Continuation-in-part of Ser. No. 681,950, Dec. 14, 1984, abandoned, which is a continuation-in-part of Ser. No. 504,582, Jun. 15, 1983, Pat. No. 4,540,753.

[51] Int. Cl.$^4$ .................. C08F 12/34; C08F 36/20; C08F 212/34
[52] U.S. Cl. .................. 526/336; 525/322; 525/323; 525/324; 526/280; 526/283; 526/348
[58] Field of Search .............. 526/348, 280, 283, 336; 525/322, 323, 324, 240, 289, 290

[56] References Cited

U.S. PATENT DOCUMENTS

| | | | |
|---|---|---|---|
| 3,162,620 | 12/1964 | Gladding | 260/80.5 |
| 3,378,606 | 4/1968 | Kontos | 525/323 |
| 3,380,978 | 4/1966 | Ryan et al. | 260/88.2 |
| 3,758,643 | 9/1973 | Fischer | 525/51 |
| 3,806,558 | 4/1974 | Fischer | 525/232 |
| 3,853,969 | 12/1974 | Kontos | 525/324 |
| 3,879,494 | 4/1975 | Milkovich | 525/324 |
| 3,894,999 | 7/1975 | Boozer | 260/80.78 |
| 4,001,195 | 1/1977 | Wyatt | 526/348 |
| 4,036,912 | 7/1977 | Stricharczuk | 525/232 |
| 4,046,840 | 9/1977 | Carman et al. | 525/216 |
| 4,135,044 | 1/1979 | Beals | 526/64 |
| 4,192,935 | 3/1980 | Lovell et al. | 526/348.6 |
| 4,306,041 | 12/1981 | Cozewith et al. | 526/65 |
| 4,405,774 | 9/1983 | Miwa et al. | 526/348.2 |
| 4,414,369 | 11/1983 | Kuroda et al. | 525/65 |
| 4,480,075 | 10/1984 | Willis | 525/324 |
| 4,499,242 | 2/1985 | Loontjens | 525/323 |
| 4,540,753 | 9/1985 | Cozewith et al. | 526/88 |
| 4,598,102 | 7/1986 | Leach | 525/211 |
| 4,699,963 | 10/1987 | Klosicwicz | 525/283 |
| 4,716,207 | 12/1987 | Cozewith et al. | 526/169.2 |
| 4,786,697 | 11/1988 | Cozewith et al. | 526/88 |
| 4,789,714 | 12/1988 | Cozewith et al. | 526/88 |

FOREIGN PATENT DOCUMENTS 0059034 1/1982 European Pat. Off. .
0060609 2/1982 European Pat. Off. .
1233599 5/1971 United Kingdom .

OTHER PUBLICATIONS

Walsh, D. S. et al, *Polymer Blends and Mixtures*, 1985, pp. 267–285, Martinus Nijhoff Publishers.
William W. Graessley, "Effect of Long Branches on the Flow Properties of Polymers", pp. 332–339, *Accounts of Chemical Research*, vol. 10, 1977.
Y. Doi and S. Ueki, "Block Copolymerization of Propylene and Ethylene with the Living Coordination Catalyst V(acac)$_3$/Al(C$_2$H$_5$)$_2$Cl/Anisole", pp. 225–229, *Makromol. Chem. Rapid Commun.*, vol. 3, 1982.
G. C. Evens, "Transition Metal Catalyzed Polymerizations: Unsolved Problems", 1981 MMI International Synposium, Aug. 17–21, 1981.

Primary Examiner—Paul R. Michl
Assistant Examiner—Lee C. Wright
Attorney, Agent, or Firm—S. H. Markowitz; J. B. Murray, Jr.; W. G. Muller

[57] ABSTRACT

Nodular copolymer and method of preparing a nodular copolymer by preparing a copolymer chain and coupling it with a coupling agent. The copolymers which form the nodular copolymer are formed of first and second segments, of which the second segments, containing the coupling agent, react to form the nodular region. The nodular copolymer is particularly useful as a lube oil additive.

51 Claims, 6 Drawing Sheets

NODULAR COPOLYMERS FORMED OF ALPHA-OLEFIN COPOLYMERS COUPLED BY NON-CONJUGATED DIENES

BACKGROUND OF THE INVENTION

1. Cross Reference to Related Applications

This application is a continuation-in-part of U.S. application Ser. No. 681,950, filed on Dec. 14, 1984, now abandoned which in turn is a continuation-in-part of U.S. application Ser. No. 504,582 filed Jun. 15, 1983, now U.S. Pat. No. 4,540,753 the disclosures of which are hereby incorporated by reference thereto.

2. Field of the Invention

The present invention relates to novel copolymers of alpha-olefins and non-conjugated dienes. More specifically, it relates to novel copolymers of ethylene, other alpha-olefins, and non-conjugated diene comprised of copolymer chains having at least one chain segment containing ethylene and the alpha-olefin and a second chain segment containing ethylene, alpha-olefin, and non-conjugated diene. In particular, it relates to a process for making these copolymers, and coupling the aforedescribed polymers to form nodular branched polymers having a high bulk viscosity, and their use in lube oil and elastomer applications.

3. Background Description of Relevant Materials

For convenience, certain terms that are repeated throughout the present specification are defined below:

(a) Inter-CD defines the compositional variation, in terms of ethylene content, among polymer chains. It is expressed as the minimum deviation (analogous to a standard deviation) in terms of weight percent ethylene from the average ethylene composition for a given copolymer sample needed to include a given weight percent of the total copolymer sample which is obtained by excluding equal weight fractions from both ends of the distribution. The deviation need not be symmetrical. When expressed as a single number, for example 15% Inter-CD, it shall mean the larger of the positive or negative deviations. For example, for a Gaussian compositional distribution, 95.5% of the polymer is within 20 wt. % ethylene of the mean if the standard deviation is 10%. The Inter-CD for 95.5 wt. % of the polymer is 20 wt. % ethylene for such a sample.

(b) Intra-CD is the compositional variation, in terms of ethylene, within a copolymer chain. It is expressed as the minimum difference in weight (wt.) % ethylene that exists between two portions of a single copolymer chain, each portion comprising at least 5 weight % of the chain.

(c) Molecular weight distribution (MWD) is a measure of the range of molecular weights within a given copolymer sample. It is characterized in terms of at least one of the ratios of weight average to number average molecular weight, $\bar{M}_w/\bar{M}_n$, and Z average to weight average molecular weight, $\bar{M}_z/\bar{M}_w$, where $$\bar{M}_w = \frac{\Sigma NiMi^2}{\Sigma NiMi}$$

$$\bar{M}_n = \frac{\Sigma NiMi}{\Sigma NiMi}, \text{ and}$$

$$\bar{M}_z = \frac{\Sigma NiMi^3}{\Sigma NiMi}$$

wherein Ni is the number of molecules of weight Mi.

(d) Viscosity Index (V.I.) is the ability of a lubricating oil to accommodate increases in temperature with a minimum decrease in viscosity. The greater this ability, the higher the V.I.

(e) A nodular branched copolymer is defined by reference to FIG. 6. The region outside of the dotted sphere consists primarily of the chain segments containing only ethylene and propylene. The region inside the sphere consists primarily of the chain segments containing diene, ethylene, and propylene which have been chemically linked to one another. The regions inside and outside of the sphere will be swollen with solvent, e.g., oil, when the polymer is dissolved.

Ethylene-propylene copolymers, particularly elastomers, are important commercial products. Two basic types of ethylene-propylene copolymers are commercially available. Ethylene-propylene copolymers (EPM) are saturated compounds requiring vulcanization with free radical generators such as organic peroxides. Ethylene-propylene terpolymers (EPDM) contain a small amount of non-conjugated diolefin, such as dicyclopentadiene; 1,4-hexadiene or ethylidene norbornene, which provides sufficient unsaturation to permit vulcanization with sulfur. Such polymers that include at least two monomers, i.e., EPM and EPDM, will hereinafter be collectively referred to as copolymers.

These copolymers have outstanding resistance to weathering, good heat aging properties and the ability to be compounded with large quantities of fillers and plasticizers, resulting in low cost compounds which are particularly useful in automotive and industrial mechanical goods applications. Typical automotive uses are in tire sidewalls, inner tubes, radiator and heater hose, vacuum tubing, weather stripping and sponge doorseals, and as Viscosity Index (V.I.) improvers for lubricating oil compositions. Typical mechanical goods uses are for appliance, industrial and garden hoses, both molded and extruded sponge parts, gaskets and seals, and conveyor belt covers. These copolymers also find use in adhesives, appliance parts, as in hoses and gaskets, wire and cable, and plastics blending.

As can be seen from the above, based on their respective properties, EPM and EPDM find many, varied uses. It is known that the properties of such copolymers which make them useful in a particular application are, in turn, determined by their composition and structure. For example, the ultimate properties of an EPM or EPDM copolymer are determined by such factors as composition, compositional distribution, sequence distribution, molecular weight, and molecular weight distribution (MWD).

The efficiency of peroxide curing depends on composition. As the ethylene level increases, it can be shown that the "chemical" crosslinks per peroxide molecule increase. Ethylene content also influences the rheological and processing properties, because crystallinity, which acts as physical crosslinks, can be introduced. The crystallinity present at very high ethylene contents may hinder processibility, and may make the cured product too "hard" at temperatures below the crystalline melting point to be useful as a rubber.

Milling behavior of EPM or EPDM copolymers varies radically with MWD. Narrow MWD copolymers crumble on a mill, whereas broad MWD materials will band under conditions encountered in normal processing operations. At the shear rates encountered in processing equipment, broader MWD copolymer of the same weight average molecular weight or low strain rate viscosity.

Thus, there exists a continuing need for discovering polymers with unique properties and compositions. This is easily exemplified with reference to the area of V.I. improvers for lubricating oils.

A motor oil should not be too viscous at low temperatures so as to avoid serious frictional losses, facilitate cold starting, and provide free oil circulation right from engine startup. On the other hand, it should not be too thin at working temperatures so as to avoid excessive engine wear and excessive oil consumption. It is most desirable to employ a lubricating oil which experiences the least viscosity change with changes in temperature.

The ability of a lubricating oil to accommodate increases in temperature with a minimum decrease in viscosity is indicated by its Viscosity Index (V.I.). The greater this ability, the higher the V.I.

Polymeric additives have been extensively used in lubricating oil compositions to impart desirable viscosity temperature characteristics to the compositions. For example, lubricating oil compositions which use EPM or EPDM copolymers or, more generally, ethylene -($C_3$-$C_{18}$) alpha-olefin copolymers, as V.I. improvers are well known. These additives are designed to permit formulation of lubricating oils so that changes in viscosity occurring with variations in temperature are kept as small as possible. Lubricating oils containing such polymeric additives can better maintain their viscosity at higher temperatures, while at the same time maintaining desirable low viscosity fluidity at engine starting temperatures.

Two important properties (although not the only required properties as is known) of these additives relate to low temperature performance and shear stability. Low temperature performance relates to maintaining low viscosity at very low temperatures, while shear stability relates to the resistance of the polymeric additives to being broken down into smaller chains.

Ideally, preferred V.I. improvers are polymers which have good shear stability. These polymers generally have low thickening efficiency and low molecular weight. However, generally, low molecular weight polymers have low bulk viscosity and exhibit cold flow. They are difficult to handle in the conventional rubber processing plant.

Representative prior art dealing with tubular reactors to make copolymers are as follows:

In "Polymerization of ethylene and propylene to amorphous copolymers with catalysts of vanadium oxychloride and alkyl aluminum halides"; E. Junghanns, A. Gumboldt and G. Bier; Makromol. Chem., v. 58 (12/12/62): 18–42, the use of a tubular reactor to produce ethylene-propylene copolymer is disclosed in which the composition varies along the chain length. More specifically, this reference discloses the production in a tubular reactor of amorphous ethylene-propylene copolymers using Ziegler catalysts prepared from vanadium compound and aluminum alkyl. It is disclosed that at the beginning of the tube ethylene is preferentially polymerized, and if no additional make-up of the monomer mixture is made during the polymerization, the concentration of monomers changes in favor of propylene along the tube. It is further disclosed that since these changes in concentrations take place during chain propagation, copolymer chains are produced which contain more ethylene on one end than at the other end. It is also disclosed that copolymers made in a tube are chemically non-uniform, but fairly uniform as regards molecular weight distribution. Using the data reported in their FIG. 17 for copolymer prepared in the tube, it was estimated that the $\overline{M}_w/\overline{M}_n$ ratio for this copolymer was 1.6, and from their FIG. 18 that the intermolecular compositional dispersity (Inter-CD, explained in detail below) of this copolymer was geater than 15%.

"Laminar Flow Polymerization of EPDM Polymer"; J.F. Wehner; ACS Symposium Series 65 (1978); pp 140–152 discloses the results of computer simulation work undertaken to determine the effect of tubular reactor solution polymerization with Ziegler catalysts on the molecular weight distribution of the polymer product. The specific polymer simulated was an elastomeric terpolymer of ethylene-propylene-1,4-hexadiene. On page 149, it is stated that since the monomers have different reactivities, a polymer of varying coposition is obtained as the monomers are depleted. However, whether the composition varies inter- or intramolecularly is not distinguished. In Table III on page 148, various polymers having $\overline{M}_w/\overline{M}_n$ of about 1.3 are predicted. In the third paragraph on page 144, it is stated that as the tube diameter increases, the polymer molecular weight is too low to be of practical interest, and it is predicted that the reactor will plug. It is implied in the first paragraph on page 149 that the compositional dispersity produced in a tube would be detrimental to product quality.

Wehner U.S. Pat. No. 3,681,306 is drawn to a process for producing ethylene/higher alpha-olefin copolymers having good processibility, by polymerization in at least two consecutive reaction stages. According to this reference, this two-stage process provides a simple polymerization process that permits tailor-making ethylene/alpha-olefin copolymers having predetermined properties, particularly those contributing to processibility in commercial applications such as coldflow, high green strength and millability. According to this reference, the inventive process is particularly adapted for producing elastomeric copolymers, such as ethylene/propylene/5-ethylidene-2-norbornene, using any of the coordination catalysts useful for making EPDM. The preferred process uses one tubular reactor followed by one pot reactor. However, it is also disclosed that one tubular reactor could be used, but operated at different reaction conditions to simulate two stages. As is seen from column 2, lines 14–20, the inventive process makes polymer of broader MWD than those made in a single stage reactor. Although intermediate polymer from the first (pipeline) reactor is disclosed as having a ratio of $\overline{M}_w/\overline{M}_n$ of about 2, as disclosed in column 5, lines 54–57, the final polymers produced by the inventive process have an $\overline{M}_w/\overline{M}_n$ of 2.4 to 5.

Closon U.S. Pat. No. 3,625,658 discloses a closed circuit tubular reactor apparatus with high recirculation rates of the reactants, which can be used to make elastomers of ethylene and propylene. With particular reference to FIG. 1, a hinged support 10 for vertical leg 1 of the reactor allows for horizontal expansion of the bottom leg thereof and prevent harmful deformations due to thermal expansions, particularly those experienced during reactor clean out.

Bailey U.S. Pat. No. 4,065,520 et al. discloses the use a of batch reactor to make ethylene copolymer, including elastomers, having broad compositional distributions. Several feed tanks for the reactor are arranged in series, with the feed to each being varied to make the polymer. The products made have crystalline to semi-crystalline to amorphous regions and gradient changes in between. The catalyst system can use vanadium compounds alone or in combination with titanium compound and is exemplified by vanadium oxy-trichloride and diisobutyl aluminum chloride. In all examples titanium compounds are used. In several examples hydrogen and diethyl zinc, known transfer agents, are used. The polymer chains produced have a compositionally dispersed first length and uniform second length. Subsequent lengths have various other compositional distributions.

In "Estimation of Long-Chain Branching in Ethylene-Propylene Terpolymers from Infinite-Dilution Viscoelastic Properties"; Y. Mitsuda, J. Schrag, and J. Ferry; *J. Appl. Pol. Sci.*, 18, 193 (1974) narrow MWD copolymers of ethylene-propylene are disclosed. For example, in Table II on page 198, EPDM copolymers are disclosed which have $\overline{M}_w/\overline{M}_n$ of from 1.19 to 1.32.

In "The Effect of Molecular Weight and Molecular Weight Distribution on the Non-Newtonian Behavior of Ethylene-Propylene-Diene Polymers" *Trans. Soc. Rheol.*, 14, 83 (1970); C. K. Shih, a whole series of compositionally homogeneous fractions were prepared and disclosed. For example, the data in Table I discloses polymer Sample B having a high degree of homogeneity. Also, based on the reported data, the MWD of the sample is very narrow. However, the polymers are not disclosed as having intramolecular dispersity.

Representative prior art dealing with ethylene-alpha-olefin copolymers as lubricating oil additives are as follows:

Engel U.S. Pat. No. 3,697,429 et al. discloses a blend of ethylene-propylene copolymers having different ethylene contents, i.e., a first copolymer of 40–83 wt. % ethylene and $\overline{M}_w/\overline{M}_n$ less than about 4.0 (preferably less than 2.6, e.g. 2.2) and a second copolymer of 3–70 wt. % ethylene and $\overline{M}_w/\overline{M}_n$ less than 4.0, with the content of the first differing from the second by at least 4 wt. % ethylene. These blends, when used as V.I. improvers in lubricating oils, provide suitable low temperature viscosity properties with minimal adverse interaction between the oil pour depressant and the ethylene-propylene copolymer.

TABLE I

| Example | Catalyst g/hr | Cocatalyst g/hr | Feeds to Reactor[1] Feed Point 11 | | | | Feed Point 13 | | | wt % 2nd segment | Polymer Comp. | | M[2] 100°C | $\overline{M}_w$ | $\overline{M}_w/\overline{M}_n$ | $\eta_0^{[3]}$ poise at 100°C | Visc[4] Ratio |
|---|---|---|---|---|---|---|---|---|---|---|---|---|---|---|---|---|---|
| | | | $C_2^=$ g/hr | $C_3^=$ g/hr | Diene g/hr | $C_6$ 1/hr | $C_2^=$ g/hr | Diene g/hr | $C_6$ 1/hr | | $C_2^=$ wt % | Diene wt % | | | | | |
| 1A | 2.22 | 17 | 220 | 2000 | 0 | 90 | 0 | 27.5 | 15 | 26 | 45.7 | — | 22 | $1.0 \times 10^5$ | 1.4 | $7 \times 10^5$ | 1.6 |
| 1B | 2.22 | 17 | 220 | 2000 | 0 | 90 | 30 | 27.5 | 15 | 40 | 46.7 | 5.7 | 25 | $.9 \times 10^5$ | 1.3 | $6 \times 10^5$ | 2.5 |
| 1C | 2.22 | 17 | 220 | 2000 | 0 | 90 | 110 | 27.5 | 15 | 48 | 50.3 | 6.0 | 87 | $1.5 \times 10^5$ | 1.5 | $5 \times 10^7$ | 100 |
| 2 | 4.44 | 34 | 330 | 3000 | 0 | 60 | 0 | 24.0 | 5 | — | 36.0 | 1.7 | 24 | $1.1 \times 10^5$ | 1.5 | $2 \times 10^6$ | 5.0 |
| 3 | 2.2 | 25 | 250 | 2000 | 0 | 90 | 50 | 24 | 0 | — | — | — | — | — | — | — | — |
| 5 | 2.2 | 17 | 50 | 400 | 5 | 20 | 200 | 2000[5] | 60 | — | — | — | — | — | — | — | — |
| 7 | 2.2 | 25 | 250 | 2000 | 0 | 20 | 50 | 10 | 5 | — | — | — | — | — | — | — | — |

[1] $C_2^=$ = ethylene
$C_3^=$ = propylene
$C_6$ = hexane
NBD = norbornadiene
ENB = ethylidene norbornene
[2] Mooney viscosity
[3] Bulk viscosity
[4] Bulk viscosity/Bulk viscosity for linear polymer of same $\overline{M}_w$
[5] Propylene U.S. Pat. No. 3,522,180 discloses copolymers of ethylene and propylene, having a number average molecular weight of 10,000 to 40,000 and a propylene content of 20 to 70 mole percent, as V.I. improvers in lube oils. The preferred $\overline{M}_w/\overline{M}_n$ of these copolymers is less than about 4.0.

Johnston U.S. Pat. No. 3,691,078 et al. discloses the use of ethylene-propylene copolymers containing 25–55 wt. % ethylene, which have a pendent index of 18–33 and an average pendent size not exceeding 20 carbon atoms, as lube oil additives. The $\overline{M}_w/\overline{M}_n$ is less than about 8. These additives impart to the oil good low temperature properties with respect to viscosity without adversly affecting pour point depressants.

Jacobson U.S. Pat. No. 3,551,336 et al. discloses the use of ethylene copolymers of 60–80 mole % ethylene, having no more than 1.3 wt. % of a polymer fraction which is insoluble in normal decane at 55° C., as oil additives. Minimization of This decane-insoluble fraction in the polymer reduces the tendency of the polymer to form haze in the oil, which haze is evidence of low temperature instability probably caused by adverse interaction with pour depressant additives. The $\overline{M}_w/\overline{M}_n$ of these copolymers is "suprisingly narrow" and is less than about 4.0, preferably less than 2.6, e.g., 2.2.

In the case of viscosity index improvers, *random* cross-linking is neither a necessary nor desirable characteristic of the polymer. Illustrative of the patents dealing with unsaturated branched ethylene ter- and tetrapolymers is U.S. Pat. No. 3,790,480. Polymers of ethylene, $C_3$–$C_{18}$ higher alpha-olefins and two classes of dienes are taught, the dienes having double bonds of the same or different polymerizability. In one class of dienes represented by 1,4-hexadiene, only one of the double bonds is readily polymerizable by the catalyst used. In another class of which 2,5-norbornadiene is representative, both double bonds are polymerizable utilizing the polymerization process of the patent. It is taught that the preferred viscosity indexes improvers are ethylene tetrapolymers wherein both classes of double bonds are used. Such polymers contain diene along the full length of the chain and are not nodularly branched. Random branching does not improve shear stability at a given TE in the effective manner of nodular branching.

Presumably, superior properties are achieved because use of a diene with two active double bonds results in long chain branching, with a concomitant increase in bulk viscosity of the polymer, but without any significant increase in intrinsic viscosity or thickening efficiency. Increased bulk viscosity facilitates the manufacture and storage of the polymer. The catalyst used for polymerization is a Ziegler type catalyst. Both double bonds of the 2,5-norbornadiene are polymerizable by the Ziegler catalyst. The other diene, 1,4-hexadiene, however, has only one Ziegler catalyst polymerizable double bond. Hence, the polymers include a minor amount of unsaturation.

SUMMARY OF THE INVENTION

The objectives of the invention are achieved according to the invention which provides a copolymer chain comprising:

(a) a first segment, being in the form of one contiguous segment or a plurality of discontinuous segments, comprising a copolymer of ethylene and an alpha-olefin; and (b) a second segment comprising a copolymer of ethylene, an alpha-olefin and a coupling agent, the second segment constituting less than 50 percent by weight of the copolymer chain, the second segment being in the form of one contiguous segment or a plurality of discontinuous segments;

The coupling agent being cross-linkable under conditions which do not cross-link the first segment to any substantial extent.

For purposes of this discussion, the term "coupling agent" is taken to include non-conjugated dienes which are couplable by means which do not cross-link any other non-conjugated dienes which may be present at locations in the chains where cross-linking would be considered undesirable.

In one embodiment the first segment consists essentially only of ethylene and alpha-olefin. The alpha-olefin is most preferably propylene.

The first segment may further further comprise a diene.

The second segment comprises at least 5% by weight of the copolymer chain. Each of the segments preferably differ in composition by at least 5 weight percent ethylene.

The coupling agent may be a Ziegler copolymerizable diene, and may be selected from the group consisting of norbornadiene, vinyl norbornene, or butenyl norbornene.

Alternatively, the coupling agent may be a cross-linkable diene, and may be selected from the group consisting of ENB,; 1,4-hexadiene or dicyclopentadiene.

For purposes of the invention coupling agents may be taken more broadly than merely non-conjugated dienes and extend to include other techniques which can result in formation of the nodule at the desired chain locations. Thus, instead of non-conjugated dienes functional olefins such as olefinic chlorosilanes which are cross-linked by exposure to moisture may be considered coupling agents.

The invention is further directed to a plurality of copolymer chains of the invention.

The plurality of copolymer chains preferably have $\overline{M}_w/\overline{M}_n$ less than 2, most preferably less than 1.4. The plurality of copolymer chains preferably also have $\overline{M}_z/\overline{M}_w$ less than 1.8, and most preferably less than 1.3. Most preferably, the chains have both of these properties.

The first segments preferably have $\overline{M}_w/\overline{M}_n$ less than 2, most preferably less than 1.4, and/or preferably have $\overline{M}_z/\overline{M}_w$ less than 1.8, most preferably less than 1.3.

The plurality of copolymer chains have a weight average molecular weight of about 2,000–12,000,000, preferably a weight average molecular weight of at least 10,000, and most preferably 20,000.

The inter-CD is such that 95 weight percent of the copolymer chains have an ethylene composition that differs from the average weight percent ethylene composition by 15% or less, most preferably 10% or less.

The intra-CD is such that at least two portions of each chain, each portion comprising at least 5 weight percent of the chain, differ in composition from one another by at least 5 weight percent ethylene, preferably at least 10 weight percent ethylene, and most preferably at least 20 weight percent ethylene.

The chains of the invention may be combined with chains not having the properties of the invention where it may be desired to blend the properties of the two substances for whatever reason, although it is preferred that the plurality of copolymer chains constitute greater than 50% by weight of the total of the polymer and copolymer chains.

Another significant aspect of the invention is directed to a nodular ethylene - alpha-olefin copolymer product of copolymer chains comprising a nodule region of substantial cross-linking of copolymer chain second segments, with substantially uncross-linked copolymer chain first segments extending therefrom.

The nodule region preferably contains less than 50% by weight of the copolymer.

The chain first segments, being in the form of one contiguous segment or a plurality of discontinuous segments, comprise a copolymer of ethylene and an alpha-olefin; and the chain second segments comprise a copolymer of ethylene, an alpha-olefin and a coupling agent. The second segments constitute less than 50 percent by weight of each copolymer chain formed by the first and second segments, with the second segments being in the form of one contiguous segment or a plurality of discontinuous segments.

The various chain segments, as well as the chains themselves, most preferably exhibit the qualities noted above. Although strictly speaking once the various chains become cross-linked to form the nodules of the invention they lose their identity, for purposes of simplicity the various qualities of the chains and segments are referenced as if the chains and segments maintained their identity after cross-linking.

As with the chains themselves, the nodular copolymer itself may further comprise additional polymer chains, in which case the copolymer chains of the invention constitute greater than 50% by weight of the total of the polymer and copolymer chains in the nodule.

The invention is further directed to a process of forming a nodular ethylene - alpha-olefin copolymer product comprising a nodule region of substantial cross-linking of chain second segments, with substantially uncross-linked chain first segments extending therefrom, comprising reacting copolymer chains containing:

(a) a first segment in the form of one contiguous segment or a plurality of discontinuous segments comprising a copolymer of ethylene and an alpha-olefin; and (b) a second segment comprising a copolymer of ethylene, an alpha-olefin and a coupling agent, the second segment constituting less than 50 percent by weight of the copolymer chain, the second segment being in the form of one contiguous segment or a plurality of discontinuous segments;

The coupling agent being cross-linkable under conditions which do not cross-link the first segment to any substantial extent, to form the nodular copolymer. According to the invention the second segments are cross-linked to form the inventive nodules.

Again, when forming the nodular product according to the invention, the product and constituent chains and segments have the various qualities and characteristics recited above, and need not be repeated.

The inventive process extends to incorporating additional polymer chains constituting less than 50% by weight of the nodular copolymer.

The cross-linking of the coupling agent may, in one embodiment be achieved by means of a catalyst which comprises hydrocarbon-soluble vanadium compound and/or organo-aluminum compound, at least one of the vanadium compound and organo-aluminum compounds containing a valence-bonded halogen. The process comprises, according to one preferred embodiment reacting the hydrocarbon-soluble vanadium and organo-aluminum compounds to form essentially one active catalyst species.

The process may be performed by reacting:

(a) hydrocarbon-soluble vanadium compound selected from the group consisting of:

where $x = 0-3$ and $R =$ hydrocarbon radical;

$VCl_4$;

$VO(AcAc)_2$, where $AcAc =$ acetyl acetonate $V(AcAc)_3$, where $AcAc =$ acetyl acetonate $VOCl_x(AcAc)_{3-x}$, where $x = 1$ or 2 and $AcAc =$ acetyl acetonate;

and mixtures thereof; and $VCl_3 \cdot nB$, where $n = 2-3$ and $B =$ Lewis base capable of forming hydrocarbon-soluble complexes with $VCl_3$, and mixtures thereof; and (b) organo-aluminum compound selected from the group consisting of:

$AlR_3$ $AlR_2Cl$, $Al_2R_3Cl_3$, $AlRCl_2$, $AlR'RCl$, $Al(OR')R_2$, $R_2Al-OAlR_2$, $AlR_2I$, and mixtures thereof, where R and R' are hydrocarbon radicals.

Most preferably, the catalyst comprises $VCl_4$ and $Al_2R_3Cl_3$.

The mole ratio of aluminum to vanadium in the catalyst is preferably about 4 to 15.

Alternatively, the cross-linking of the coupling agent may be catalyzed with cationic catalyst. The cationic catalyst may be a Lewis acid, and may be selected from the group consisting of: $AlCl_3$, $BF_3$, $SnCl_4$, $SbCl_5$, and mixtures thereof.

According to yet another embodiment the cross-linking agent may be a free radical catalyst. The free radical catalyst may be a peroxide selected from the group consisting of: dicumyl peroxide, di-tertiary butyl peroxide, t-butylperbenzoate, 1,1 di(t-butylperoxy) 3,3,5 trimethyl cyclohexane, and mixtures thereof. Other free radical catalysts include azo-bis isobutyrl nitrile, azo dicarboxylate, and mixtures thereof.

In yet another embodiment the cross-linking of the coupling agent is catalyzed with an olefin coupling agent. The olefin coupling agent may be selected from the group consisting of sulfur dichloride, disulfenyl halides, borane, dithiolalkanes, other sulfur and accelerated sulfur curating and mixtures thereof.

On a more fundamental plane, the invention is directed as well to a polymerization process for producing a copolymer chain comprising:

(a) a first segment comprising one contiguous segment or a plurality of discontinuous segments of a copolymer of ethylene and an alpha-olefin; and (b) a second segment comprising a copolymer of ethylene, an alpha-olefin and a coupling agent, the second segment constituting less than 50 percent by weight of the copolymer chain, the second segment being in the form of one contiguous segment or a plurality of discontinuous segments on a given chain;

The coupling agent being cross-linkable under conditions which do not cross-link the first segment to any substantial extent, the process comprising:

polymerizing a reaction mixture of ethylene and alpha-olefin until the weight of the ethylene-alpha-olefin copolymer has reached at least 50% of the anticipated polymer weight at completion of polymerization so as to form the first segment, and then incorporating the coupling agent to form the second segment.

Once again, the reaction mixture forms a plurality of the copolymer chains, and the process further comprises cross-linking the second segments of the plurality of the copolymer chains to form a nodule.

Most preferably the process is performed by polymerizing the ethylene-alpha-olefin, coupling agent reaction mixture in at least one mix-free reactor to form a plurality of the copolymer chains. The polymerization is most preferably catalyzed by essentially one active catalyst species. The reaction mixture is essentially transfer-agent free. The polymerization is performed under conditions sufficient to initiate propagation of substantially all the copolymer chains simultaneously. In one particularly preferred embodiment the polymerization is performed in a tubular reactor.

The final temperature of the reaction mixture is maintained at a temperature of less than about 150 degrees C.

Additional reaction mixture comprising at least one of ethylene, other alpha-olefin monomer, and a non-conjugated diene may be injected at at least one feed site along the reactor.

The coupling agent is preferably incorporated in an amount of about 0.10 to about 50% mole percent based upon the total moles of monomer in the second chain segment.

When using catalyst of the type discussed above, which is formed by reaction, the components are preferably premixed for about 0.1–5000 seconds, most preferably 1–50 seconds.

The invention is further directed to a lubricating oil composition comprising an effective amount of a nodular copolymer additive according to the invention, or made according to the invention. In such an oil composition the nodular copolymer additive is present in an amount of about 0.1 to about 15.0% by weight of the total composition.

The lubricating oil itself may be hydrocarbon mineral oil based, or may comprise up to 25 weight percent synthetic lubricating oil.

Likewise, the invention is directed to a lubricating oil concentrate comprising a nodular copolymer additive according to the invention, or made according to the invention. The nodular copolymer is preferably present in an amount of about 5–50% by weight of the total composition.

DETAILED DESCRIPTION OF THE INVENTION

The present invention is drawn to a novel nodular branched copolymer of ethylene, at least one other alpha-olefin monomer, and a non-conjugated diene copolymer. In particular, the individual polymer chains, prior to coupling, have at least one segment that contains only ethylene and the alpha-olefin, and a second segment that contains ethylene, the alpha-olefin, and the non-conjugated diene.

The MWD of the copolymer prior to forming the nodular branched copolymer is very narrow. For example, an indication of a narrow MWD in accordance with the present invention is that the ratio of weight to number average molecular weight ($\overline{M}_w/\overline{M}_n$) is less than 2. Alternatively, a ratio of the Z-average molecular weight to the weight average molecular weight ($\overline{M}_z/\overline{M}_w$) of less than 1.8 typifies a narrow MWD in accordance with the present invention. It is known that the property advantages of copolymers in accordance with the present invention are related to these ratios. Small weight fractions of material can disproportionately influence these ratios while not significantly altering the property advantages which depend on them. For instance, the presence of a small weight fraction (e.g. 2%) of low molecular weight copolymer can depress $\overline{M}_n$, and thereby raise $\overline{M}_w/\overline{M}_n$ above 2 while maintaining $\overline{M}_z/\overline{M}_w$ less than 1.8. Therefore, the polymers, in accordance with the present invention, which are to be coupled, are characterized by having at least one of $\overline{M}_w/\overline{M}_n$ less than 2 and $\overline{M}_z/\overline{M}_w$ less than 1.8.

To obtain the intramolecular compositional heterogeneity and narrow MWD, the copolymers in accordance with the present invention are preferably made in a tubular reactor.

Nodular branching is beneficial in two ways. First it changes the bulk (pure polymer) viscosity molecular weight, relationship. In general, above a certain molecular weight at high polymer concentration the viscosity will be higher than for a linear polymer of the same molecular weight or thickening efficiency. This is discussed in W. W. GRAESSLEY, Accounts of Chemical Research, Vol. 10, p. 332, 1977. Furthermore, nodular branching can increase the mechanical shear stability at a given thickening efficiency as compared to linear polymers. Through either of these two effects it is possible to manufacture more shear stable polymers.

To form the nodular copolymers of this invention, the aforedescribed polymer chains are coupled by reacting the residual double bonds, in the non-conjugated diene in one polymer chain, with similar double bonds in other chains. The coupling reaction can be catalyzed by either Ziegler, cationic, free radical catalysis, or olefin coupling agents. These polymers exhibit enhanced bulk viscosity and reduced cold flow compared to other polymers of equivalent lubricating oil thickening efficiency (T.E.). It has been discovered that to produce such copolymers requires the use of numerous heretofore undisclosed method steps conducted within heretofore undisclosed preferred ranges. Accordingly, the present invention is also drawn to a method for making the novel copolymers of the present invention.

Copolymers in accordance with the present invention have been found to have improved properties in lubricating oil, especially when coupled to form the nodular polymers of this invention. Accordingly, the present invention is also drawn to a novel oil additive composition which comprises basestock mineral oil of lubricating viscosity containing an effective amount as a Viscosity Index improver, of copolymer in accordance with the present invention.

BRIEF DESCRIPTION OF THE DRAWINGS

The accompanying drawings depict, for illustration purposes only, processes embodied by the present invention, wherein.

Figure 1:
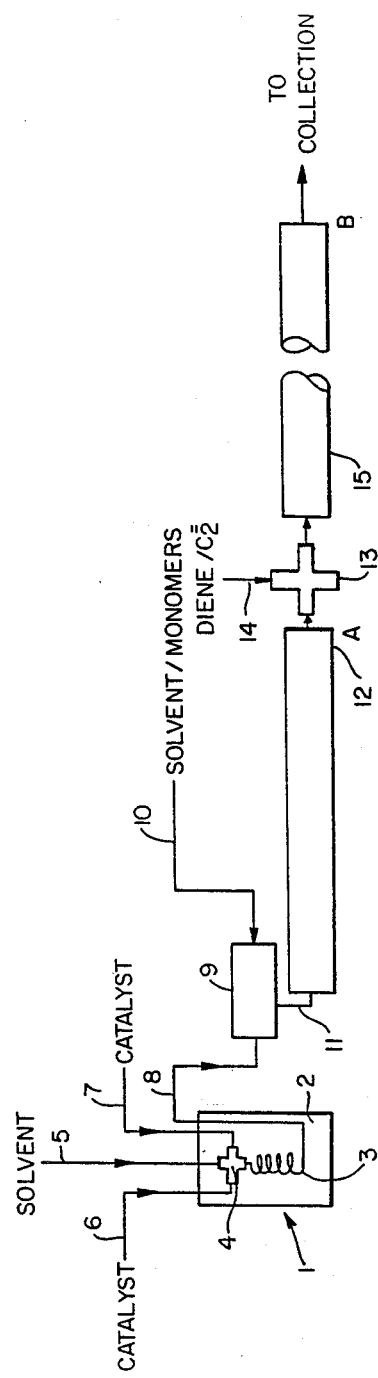
FIG. 1 is a schematic representation of a process for producing polymer in accordance with the present invention.

As already noted above, the present invention is drawn to novel copolymers of ethylene, at least one other alpha-olefin monomer, and a non-conjugated diene, the copolymers having a MWD prior to coupling characterized by at least one of a $\overline{M}_w/\overline{M}_n$ value of less than 2 and a $\overline{M}_z/\overline{M}_w$ value of less than 1.8. The copolymer is coupled by reaction of the residual unsaturation of the non-conjugated diene to form the nodular polymers of this invention. More specifically, copolymers in accordance with one embodiment of the present invention comprise intramolecularly heterogeneous chains wherein at least one portion of an individual intramolecularly heterogeneous chain contains only ethylene and alpha-olefin and has a $\overline{M}_w$ of at least $10^4$, and another portion contains ethylene, alpha-olefin, and non-conjugated diene. In the following detailed description of the invention, we use propylene to exemplify the alpha-olefin since it is the most preferred.

Copolymers in accordance with the present invention are preferably made in a tubular reactor. When polymerizing in a tube, the ethylene and propylene are fed to the reactor inlet along with a suitable Ziegler catalyst. The catalyst is preferably chosen so that it produces essentially one active catalyst species. Also, chain transfer reactions during the polymerization must be minimized. It is well known that ethylene is much more readily polymerized than propylene. Consequently, the concentration of monomer changes along the tube in favor of propylene as the ethylene is depleted. The result is copolymer chains which are higher in ethylene content in the chain segments grown near the reactor feed inlet and higher in propylene in the segments grown near the reactor outlet. The resulting chain is intramolecularly heterogeneous. The extent of heterogeneity in ethylene/propylene compositions can be moderated somewhat by feeding additional ethylene at points along the reactor to keep the ethylene/propylene monomer ratio at a more constant value. It is an object of this invention to produce chains with a minimum of interchain compositional variation in order to assure uniform coupling. This is accomplished by utilizing a Ziegler catalyst that forms essentially one active catalyst species, minimizing chain transfer reactions initiating propagation of essentially all chains simultaneously, and conducting the polymerization such that the major portion of the catalyst remains active for the entire length of time that polymerization is occurring in the reactor. The tubular reactor is also operated at conditions such that the copolymer chains have a narrow MWD characterized by at least one of the ratios of $\overline{M}_w/\overline{M}_n$ and $\overline{M}_z/\overline{M}w$ being less than 2.0 and 1.8, respectively, prior to coupling.

In one embodiment polymerization of the ethylene and propylene is initiated at the reactor inlet and continued until a first polymer segment forms comprising at least 50% of the weight of the total polymer to be produced. Additional monomer feed is then added to the tube consisting of non-conjugated diene either alone or in combination with the other monomer and/or solvent. at the point of non-conjugated dien addition, at least 50% of the ultimate anticipated mass ot the polymer should have been formed. A second chain segment is then formed with a non-conjugated diene content of at least 0.1 mole % and with a $\overline{M}_w$ value of at least 2000. If the first polymer segment is formed as a series of discontinuous segments the first segment shall be considered to include the segments as a whole for definitional purposes.

Several techniques are available for producing the nodular branched polymer of this invention. If the non-conjugated diene has both double bonds polymerizable by the Ziegler catalyst, branching will occur simultaneously with polymerization in the reactor. In this case the polymer exiting the reactor will be the final product.

If coupling is to be catalyzed cationically, the cationic catalyst can either be added to the tubular reactor, to carry out the coupling in the reactor, or to the polymer product exiting the reactor so that the coupling can be carried out in a separate process step. Free radical coupling catalysts are normally Ziegler catalyst poisons and will not perform at polymerization conditions. In this case, the coupling agent must be added, and the coupling performed, subsequent to the polymerization. Olefin cross-linking agents may also be used in a similar manner.

Copolymer in accordance with one embodiment of the present invention is preferably made in a tubular reactor. When the process takes place in a tubular reactor, it is known that, at the beginning of the tubular reactor, ethylene, due to its high reactivity, will be preferentially polymerized. However, the concentration of monomers changes along the tube in favor of propylene as the ethylene is depleted. The result is copolymer chains which are higher in ethylene concentration in the chain segments grown near the reactor inlet (as defined at the point at which the polymerization reaction commences), and higher in propylene concentration in the chain segments formed near the reactor outlet. An illustrative copolymer chain of ethylene-proplyene is schematically presented below, with E representing ethylene constituents, and P representing propylene constituents in the chain:

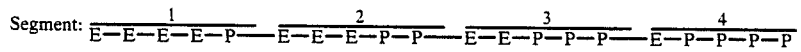

Segment: $\underline{\phantom{xx}1\phantom{xx}}$ $\underline{\phantom{xx}2\phantom{xx}}$ $\underline{\phantom{xx}3\phantom{xx}}$ $\underline{\phantom{xx}4\phantom{xx}}$
E—E—E—E—P —— E—E—E—P—P —— E—E—P—P—P —— E—P—P—P—P As can be seen from this illustrative schematic chain, the far left-hand segment (1) thereof represents that portion of the chain formed at the reactor inlet where the reaction mixture is proportionately richer in the more reactive constituent ethylene. This segment comprises four ethylene molecules and one propylene molecule. However, as subsequent segments are formed from left to right, with the more reactive ethylene being depleted and the reaction mixture proportionately increasing in propylene concentration, the subsequent chain segments become more concentrated in propylene. The resulting chain is intramolecularly heterogeneous.

In the event that more than two monomers are used, e.g., in the production of EPDM using a diene termonomer, for purposes of describing the present invention all properties related to homogeneity and heterogeneity will refer to the relative ratio of ethylene to the other monomers in the chain. The property, of the copolymer discussed herein, related to intramolecular compositional dispersity (compositional variation within a chain) shall be referred to as Inter-CD.

For copolymer chains in accordance with the present invention, composition can vary between chains as well as along the length of the chain. In one embodiment, an object of this invention is to minimize the amount of interchain variation. The Inter-CD can be characterized by the difference in composition between some fraction of the copolymer and the average composition, as well as by the total difference in composition between the copolymer fractions containing the highest and lowest quantity of ethylene. Techniques for measuring the breadth of the Inter-CD are known, as illustrated by Junghanns et al., wherein a p-xylene-dimethylformamide solvent/non-solvent was used to fractionate copolymer into fractions of differing intermolecular composition. Other solvent/non-solvent systems can be used, such as hexane-2-propanol, as will be discussed in more detail below.

The Inter-CD of copolymer in accordance with one embodiment of the present invention is such that 95 wt. % of the copolymer chains have an ethylene composition that differs from the average weight percent ethylene composition by 15 wt. % or less. The preferred Inter-CD is about 13% or less, with the most preferred being about 10% or less. In comparison, Junghanns et al. found that their tubular reactor copolymer had an Inter-CD of greater than 15 weight %.

Broadly, the Intra-CD of copolymer in accordance with one embodiment of the present invention is such that at least two portions of an individual intramolecularly heterogeneous chain, each portion comprising at least 5 weight percent of the chain, differ in composition from one another by at least 5 weight percent ethylene. Unless otherwise indicated, this property of Intra-CD as referred to herein is based upon at least two 5 weight percent portions of copolymer chain. The Intra-CD of copolymer in accordance with the present invention can be such that at least two portions of copolymer chain differ by at least 10 weight percent ethylene. Differences of at least 20 weight percent ethylene, as well as of at least 40 weight percent ethylene, are also considered to be in accordance with the present invention.

The experimental procedure for determining Intra-CD is as follows. First the Inter-CD is established as described below, then the polymer chain is broken into fragments along its contour and the Inter-CD of the fragments is determined. The difference is the two results is due to Intra-CD, as can be seen in the illustrative example below.

Consider a heterogeneous sample polymer containing 30 monomer units. It consists of 3 molecules designated A, B, C.

A EEEEPEEEPEEEPPEEPPEPPPEPPPPPPP
B EEEEEPEEEPEEEPPEEEPPPEPPPEEPPP
C EEPEEEPEEEPEEEPEEEPPEEPPPEEPPP

Molecule A is 36.8 wt. % ethylene, B is 46.6%, and C is 50% ethylene. The average ethylene content for the mixture is 44.3%. For this sample the Inter-CD is such that the highest ethylene polymer contains 5.7% more ethylene than the average, while the lowest ethylene content polymer contains 7.5% less ethylene than the average. Or, in other words, 100 weight % of the polymer is within +5.7% and −7.5% ethylene about an average of 44.3%. Accordingly, the Inter-CD is 7.5% when the given weight % of the polymer is 100%. The distribution may be represented graphically as by curve 1 in FIG. 3.

If the chains are broken into fragments, there will be a new Inter-CD. For simplicity, consider first breaking only molecule A into fragments shown by the slashes as follows:

EEEEP/EEEPE/EEPPE/EPPEP/-
PPEPP/PPPPP

Figure 3:
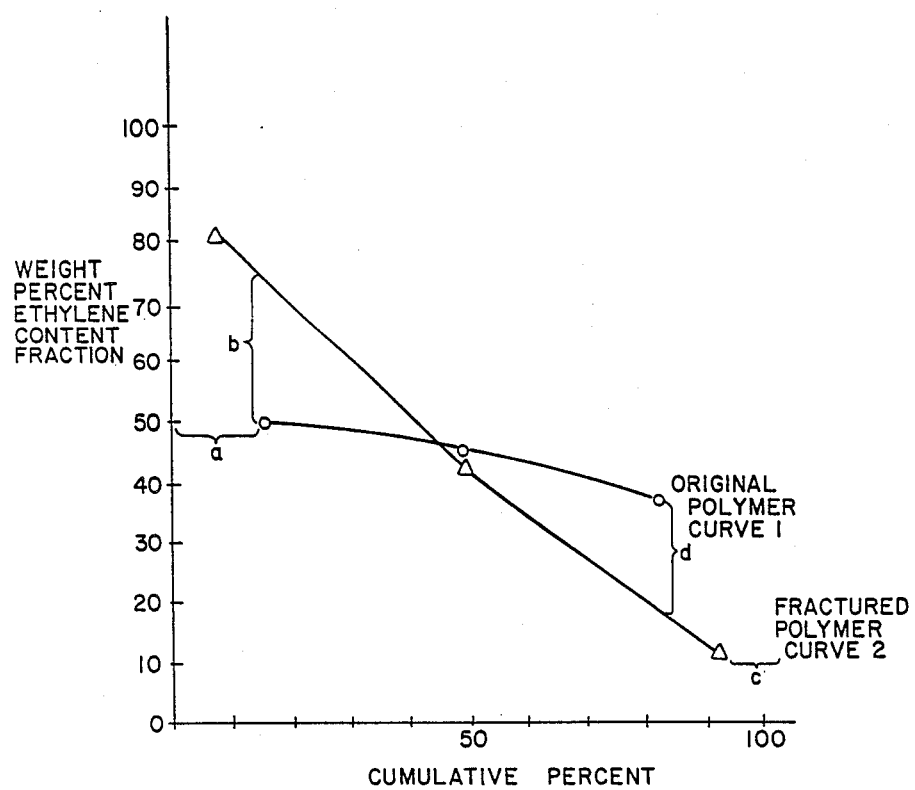
FIG. 3 is a graphical illustration of a technique for determining Intra-CD of a polymer.

Portions of 72.7%, 72.7%, 50%, 30.8%, 14.3% and 0% ethylene are obtained. If molecules B and C are similarly broken and the weight fraction of similar composition are grouped, the new Inter-CD shown by curve 2 in FIG. 3 is obtained. The difference between the two curves in the figure is due to Intra-CD.

Consideration of such data, especially near the end point ranges, demonstrates that for this sample at least 5% of the chain contour represented by the cumulative weight % range (a) differs in composition from another section by at least 15% ethylene shown as (b), the difference between the two curves. The difference in composition represented by (b) cannot be intermolecular. If it were, the separation process for the original polymer would have revealed the higher ethylene contents seen only for the degraded chain.

The compositional differences shown by (b) and (d) in the figure between original and fragmented chains give minimum values for Intra-CD. The Intra-CD must be at least that great, for chain sections have been isolated which are the given difference in composition (b) or (d) from the highest or lowest composition polymer isolated from the original. We know in this example that the original polymer represented at (b) had sections of 72.7% ethylene and 0% ethylene in the same chain. It is highly likely that, due to the inefficiency of the fractionation process, any real polymer with Intra-CD examined will have sections of lower or higher ethylene connected along its contour than that shown by the end points of the fractionation of the original polymer. Thus, this procedure determines a lower bound for Intra-CD. To enhance the detection, the original whole polymer can be fractionated (e.g., separate molecule A from molecule B from molecule C in the hypothetical example) with these fractions refractionated until they show no (or less) Inter-CD. Subsequent fragmentation of this intermolecularly homogeneous fraction now reveals the total Intra-CD. In principle, for the example, if molecule A were isolated, fragmented, fractionated and analyzed, the Intra-CD for the chain sections would be 72.7%−0%=72.7% rather than 72.7%−50%=22.7% seen by fractionating the whole mixture of molecules A, B, and C.

In order to determine the fraction of a polymer which is intramolecularly heterogeneous in a mixture of polymer combined from several sources, the mixture must be separated into fractions which show no further heterogeneity upon subsequent fractionation. These fractions are subsequently fractured and fractionated to reveal polymer heterogeneity.

The fragments into which the original polymer is broken should be large enough to avoid end effects and to give a reasonable opportunity for the normal statistical distribution of segments to form over a given monomer conversion range in the polymerization. Intervals of ca 5 weight % of the polymer are convenient. For example, at an average polymer molecular weight of about $10^5$, fragments of ca 5000 molecular weight are appropriate. A detailed mathematical analysis of plug flow or batch polymerization indicates that the rate of change of composition along the polymer chain contour will be most severe at high ethylene conversion near the end of the polymerization. The shortest fragment are needed here to show the low propylene content sections.

The best available technique for determination of compositional dispersity for non-polar polymers is solvent/non-solvent fractionation which is based on the thermodynamics of phase separation. This technique is described in "Polymer Fractionation", M. Cantow editor, Academic 1967, p. 341 ff and in H. Inagaki, T. Tanaku, *Developments in Polymer Characterization*, 3, 1 (1982). These are incorporated herein by reference.

For non-crystalline copolymers of ethylene and propylene, molecular weight governs insolubility more than does composition in a solvent/non-solvent solution. High molecular weight polymer is less soluble in a given solvent mix. Also, there is a systematic correlation of molecular weight with ethylene content for the polymers described herein. Since ethylene polymerizes much more rapidly than propylene, high ethylene polymer also tends to be high in molecular weight. Additionally, chains rich in ethylene tend to be less soluble in hydrocarbon/polar non-solvent mixture than propylene-rich chains. Thus the high molecular weight, high ethylene chains are easily separated on the basis of thermodynamics.

A fractionation procedure is as follows: Unfragmented polymer is dissolved in n-hexane at 23° C. to form ca a 1% solution (1 g polymer/100 cc hexane). Isopropyl alcohol is titrated into the solution until turbidity appears at which time the precipitate is allowed to settle. The supernatant liquid is removed and the precipitate is dried by pressing between Mylar ® (polyethylene terphthalate) film at 150° C. Ethylene content is determined by ASTM method D-3900. Titration is resumed and subsequent fractions are recovered and analyzed until 100% of the polymer is collected. The titrations are ideally controlled to produce fractions of 5–10% by weight of the original polymer especially at the extremes of composition.

To demonstrate the breadth of the distribution, the data are plotted as % ethylene versus the cumulative weight of polymer as defined by the sum of half the weight % of the fraction of that composition plus the total weight % of the previously collected fractions.

Another portion of the original polymer is broken into fragments. A suitable method for doing this is by thermal degradation according to the following procedure: In a sealed container in a nitrogen-purged oven, a 2 mm thick layer of the polymer is heated for 60 minutes at 330° C. This should be adequate to reduce a $10^5$ molecular weight polymer to fragments of ca 5000 molecular weight. Such degradation does not change the average ethylene content of the polymer. This polymer is fractionated by the same procedure as the high molecular weight precursor. Ethylene content is measured, as well as molecular weight on selected fractions.

Ethylene content is measured by ASTM-D3900 for ethylene-propylene copolymers between 35 and 85 wt. % ethylene. Above 85% ASTM-D2238 can be used to obtain methyl group concentrations which are related to percent ethylene in an unambiguous manner for ethylene-propylene copolymers. When comonomers other than propylene are employed, no ASTM tests covering a wide range of ethylene contents are available; however, proton and carbon 13 nuclear magnetic resonance can be employed to determine the composition of such polymers. These are absolute techniques requiring no calibration when operated such that all nuclei contribute equally to the spectra. For ranges not covered by the ASTM tests for ethylene-propylene copolymers, these nuclear magnetic resonance methods can also be used.

Molecular weight and molecular weight distribution are measured using the Waters 150 gel permeation chromtograph equipped with a Chromatix KMX-6 on-line light scattering photometer. The system is used at 135° C. with 1, 2, 4-trichlorobenzene as mobile phase. Showdex (Showa-Denko America, Inc.) polystyrene gel columns 802, 803, 804 and 805 are used. This technique is discussed in "Liquid Chromtography of Polymers and Related Material III", J. Cazes editor, Marcel Dekker, 1981, p. 207 (incorporated herein by reference). No corrections for column spreading are employed; however, data on generally accepted standards, e.g., National Bureau of Standards Polyethene 1484 and anionically produced hydrogenated polyisoprenes (an alternating ethylene-propylene copolymer) demonstrate that such corrections on $\overline{M}_w/\overline{M}_n$ or $\overline{M}_z/\overline{M}_w$ are less than 0.05 unit. $\overline{M}_w/\overline{M}_n$ is calculated from an elution time-molecular weight relationship whereas $\overline{M}_z/\overline{M}_w$ is evaluated using the light scattering photometer. The numerical analyses can be performed using the commercially available computer software GPC2, MOLWT2 available from LDC/Milton Roy-Riviera Beach, Fla.

As already noted, the first copolymer segment in accordance with the present invention is comprised of ethylene and at least one other alpha-olefin. It is believed that such alpha-olefins could include those containing 3 to 18 carbon atoms, e.g., propylene, butene-1, pentene-1, etc. Alpha-olefins of 3 to 6 carbons are preferred due to economic considerations. The most preferred alpha-olefin in accordance with the present invention is propylene.

The diene monomers suitable for use in the practice of this invention by which the narrow MWD polymers prepared by this invention are coupled, are of two types: (1) non-conjugated dienes capable of being Ziegler catalyst polymerized via both double bonds; and (2) the non-conjugated dienes of the type used to prepare EPDM where the non-conjugated diene has only one Ziegler catalyst polymerizable double bond and the other bond is cross-linkable by cationic or free radical catalysts or by olefin cross-linking agents.

Typical of the coupling agents that can be used to produce the second terpolymer segment of the chain are the following non-limiting examples:

(a) straight chain acyclic dienes such as: 1,4-hexadiene; 1,6-octadiene;

(b) branched chain acyclic dienes such as: 5-methyl-1, 4-hexadiene; 3,7-dimethyl-1,6-octadiene; 3,7-dimethyl-1,7-octadiene; 3,7-dimethyl-1,7-Octadine and the mixed isomers of dihydromyrcene and dihydroocinene;

(c) single ring alicyclic dienes such as: 1,4-cyclohexadiene; 1,5-cyclooctoadiene; and 1,5-cyclododecadiene (d) multi-ring alicyclic fused and bridged ring dienes such as: tetrahydroindene; methyltetrahydroindene; dicyclopentadiene; bicyclo-(2,2,1)-hepta-2,5 diene; alkenyl, alkylidene, cycloalkenyl and cycloalkylidene norbornenes such as 5-methylene-2-norbornene (MNB), 5-ethylidene-2-norbornene (ENB), 5-propyl-2-norbornene, 5-isopropylidene-2-norbornene, 5-(4-cyclopentenyl)-2-norbornene; 5-cyclohexylidene-2-norbornene.

Illustrative, non-limiting examples of the diene monomers coupled by Ziegler copolymerization catalysts to prepare the nodular polymers of this invention are norbornadiene, vinyl norbornene and butenyl norbornene. Illustrative of the dienes coupled by cationic cross-linkable catalysis to prepare the nodular polymers are 1,4-hexadiene, ENB, and dicyclopentadiene. Illustrative of the dienes coupled by free radical catalysts are MNB, VNB, and 1,5-hexadiene. Additionally, olefin crosslinking agents may be used. Such agents include sulfur dichloride, disulfenyl halides, borane, dithioalkenes, and mixtures thereof. Of the non-conjugated dienes typically used to prepare these copolymers, dienes containing at least one of the double bonds in a strained ring are preferred. The amount of diene (mol basis) in the diene-containing segment of the polymer could be from about 0.1% mole to 50%, with 1% to 30% being preferred. The most preferred range is 2%–20%.

The average ethylene content of the polymer could be as low as about 10% on a weight basis. The preferred minimum is about 25%. A more preferred minimum is about 30%. The maximum ethylene content could be about 90% on a weight basis. The preferred maximum is about 85%, with the most preferred being about 80%. The ethylene content of the two segments comprising the polymer can be the same or different. If different, the preferred composition range for each segment is the same as stated above for the whole polymer.

The molecular weight of copolymer made in accordance with the present invention can vary over a wide range. It is believed that the weight average molecular weight could be as low as about 2,000. The preferred minimum is about 10,000. The most preferred minimum is about 20,000. It is believed that the maximum weight average molecular weight could be as high as about 12,000,000. The preferred maximum is about 1,000,000. The most preferred maximum is about 750,000. The preferred minimum molecular weight for an ethylene-propylene copolymer chain segment is $2 \times 10^4$. For the ethylene-propylene-non-conjugated diene chain segment the preferred minimum MW is $2 \times 10^3$.

Another feature of polymer made in accordance with the present invention is that the molecular weight distribution (MWD) prior to coupling is very narrow, as characterized by at least one of a ratio of $\overline{M}_w/\overline{M}_n$ of less than 2 and a ratio of $\overline{M}_z/\overline{M}_w$ of less than 1.8 for the whole polymer and the first chain segment. Some typical advantages of such polymers having narrow MWD both before and after coupling are greater resistance to shear degradation. Particularly for oil additive applications, the preferred uncoupled copolymers have $\overline{M}_w/\overline{M}_n$ less than about 1.6, with less than about 1.4 being most preferred. The preferred $\overline{M}_z/\overline{M}_w$ is less than about 1.5, with less than about 1.3 being most preferred. The addition of diene to produce branched structures is known. However, by coupling narrow MWD polymers only near their ends, more shear stable structures are produced than by random coupling, both as a result of more favorable stress distribution in the polymer in service and less MWD broadening than in random coupling as in prior art methods.

Solution polymerizations are preferred for the polymerization process of this invention. Any known solvent for the reaction mixture that is effective for the purpose can be used. For example, suitable solvents would be hydrocarbon solvents such as aliphatic, cycloaliphatic and aromatic hydrocarbon solvents, or halogenated versions of such solvents. The preferred solvents are $C_{12}$ or lower, straight chain or branched chain, saturated hydrocarbons, $C_5$ to $C_9$ saturated alicyclic or aromatic hydrocarbons or $C_2$ to $C_6$ halogenated hydrocarbons. Most preferred are $C_{12}$ or lower, straight chain or branched chain hydrocarbons, particularly hexane. Nonlimiting illustrative examples of solvents are butane, pentane, hexane, heptane, cyclopentane, cyclohexane, cycloheptane, methyl cyclopentane, methyl cyclohexane, isoctane, benzene, toluene, xylene, chloroform, chlorobenzenes, tetrachloroethylene, dichlorethane and trichloroethane.

The polymerization process is preferably carried out in a mix-free reactor system, which is one in which substantially no mixing occurs between portions of the reaction mixture that contain polymer chains initiating at different times. Suitable reactors are a continuous flow tubular or a stirred batch reactor. A tubular reactor is well known and is designed to minimize mixing of the reactants in the direction of flow. As a result, reactant concentration will vary along the reactor length. In contrast, the reaction mixture in a continuous flow stirred tank reactor (CFSTR) is blended with the incoming feed to produce a solution of essentially uniform composition everywhere in the reactor. Consequently, the growing chains in a portion of the reaction mixture will have a variety of ages and thus a single CFSTR is not suitable for the process of this invention. However, it is well known that 3 or more stirred tanks in series with all of the catalyst fed to the first reactor can approximate the performance of a tubular reactor. Accordingly, such tanks in series are considered to be in accordance with the present invention, and as being the functional equivalent of the tubular reactor.

A batch reactor is a suitable vessel, preferably equipped with adequate agitation, to which the catalyst, solvent, and monomer are added at the start of the polymerization. The charge of reactants is then left to polymerize for a time long enough to produce the desired product. For economic reasons, a tubular reactor is preferred to a batch reactor for carrying out the processes of this invention.

In addition to the importance of the reactor system to make copolymers in accordance with the present invention, the polymerization should be preferably conducted such that:

a. the catalyst system produces essentially one active catalyst species,
b. the reaction mixture is essentially free of chain transfer agents, and
c. the polymer chains are essentially all initiated simultaneously, which is at the same time for a batch reactor or at the same point along the length of the tube for a tubular reactor.

The desired polymer can be obtained if more than one feed or solvent and reactants (e.g., at least one of the ethylene, alpha-olefin and diene) are added either at at least one point along the length of a tubular reactor or during the course of polymerization in a batch reactor. Operating in this fashion may be desirable in certain circumstances to control the polymerization rate or polymer composition. However, it is necessary to add essentially all of the catalyst at the inlet of the tube or at the onset of batch reactor operation to meet the requirement that essentially all polymer chains are initiated simultaneously.

Accordingly, processes in accordance with the present invention are most preferably carried out:

(a) in at least one mix-free reactor, (b) using a catalyst system that produces essentially one active catalyst species, (c) using at least one reaction mixture which is essentially transfer agent-free, and (d) in such a manner and under conditions sufficient to initiate propagation of essentially all polymer chains simultaneously.

Since the tubular reactor is the preferred reactor system for carrying out processes in accordance with the present invention, the following illustrative descriptions and examples are drawn to that system, but will apply to other reactor systems as will readily occur to the artisan having the benefit of the present disclosure.

In practicing processes in accordance with the present invention, use is preferably made of at least one tubular reactor. Thus, in its simplest form, such a process would make use of but a single reactor. However, as would readily occur to the artisan having the benefit of the present disclosure, more than one reactor could be used, either in parallel for economic reasons, or in series with multiple monomer feed to vary intramolecular composition.

Figure 4:
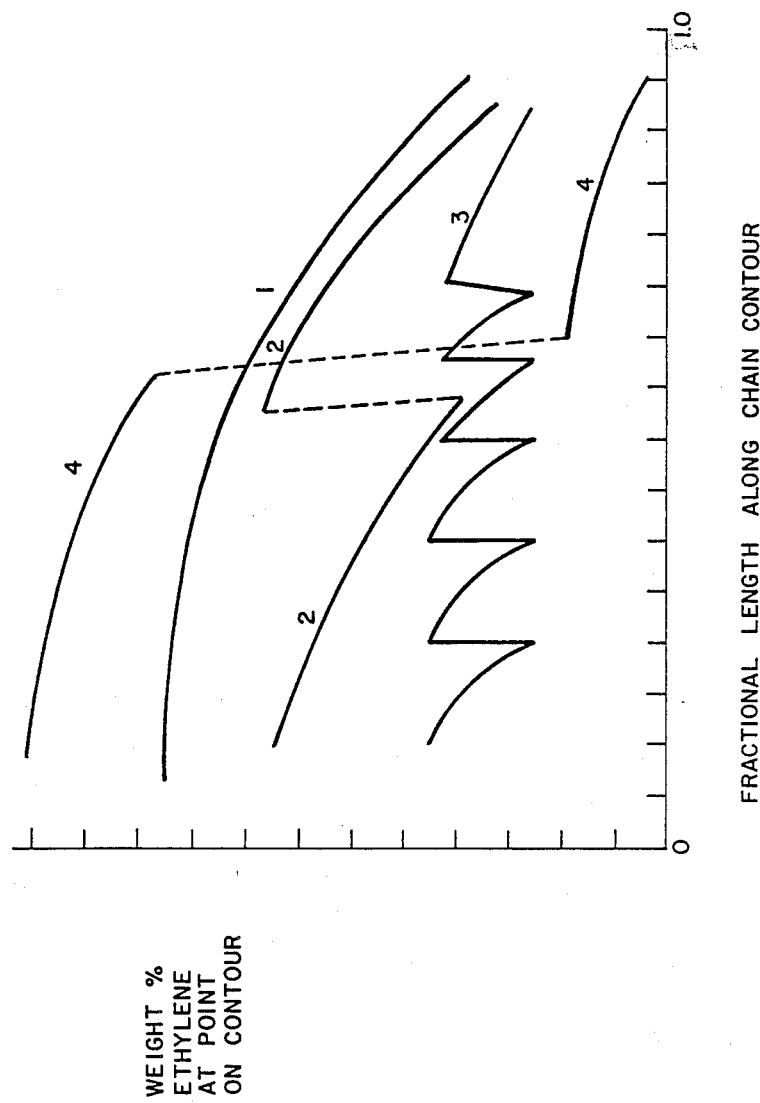
FIG. 4 graphically illustrates various copolymer structures that can be attained using processes in accordance with the present invention.

For example, various structures can be prepared by adding additional monomer(s) during the course of the polymerization. This is exemplified in FIG. 4, wherein composition is plotted versus position along the contour length of the chain for multiple monomer additions during polymerization of the ethylene-propylene copolymer chain segment. The Intra-CD of curve 1 is obtained by feeding all of the monomers at the tubular reactor inlet or at the start of a batch reaction. In comparison, the Intra-CD of curve 2 can be made by adding additional ethylene at a point along the tube, or, in a batch reactor, where the chains have reached about half their length. The Intra-CD's of curve 3 requires multiple feed additions. The Intra-CD of curve 4 can be formed if additional comonomer rather than ethylene is added. This structure permits a whole ethylene composition range to be omitted from the chain. In each case, a third or more alpha-olefin comonomers may be added.

The composition of the catalyst used to produce alpha-olefin copolymers has a profound effect on copolymer product properties such as compositional dispersity and MWD. The catalyst utilized in practicing processes in accordance with the present invention should be such as to yield essentially one active catalyst species in the reaction mixture. More specifically, it should yield one primary active catalyst species which provides for substantially all of the polymerization reaction. Additional active catalyst species could be present, provided the copolymer product is in accordance with the present invention, e.g., narrow MWD and Inter-CD. It is believed that such additional active catalyst species could provide as much as 35% (weight) of the total copolymer. Preferably, they should account for about 10% or less of the copolymer. Thus, the essentially one active species should provide for at least 65% of the total copolymer produced, preferably for at least 90% thereof. The extent to which a catalyst species contributes to the polymerization can be readily determined using the below-described techniques for characterizing catalyst according to the number of active catalyst species.

Techniques for characterizing catalyst according to the number of active catalyst species are within the skill of the art, as evidenced by an article entitled "Ethylene-Propylene Copolymers. Reactivity Ratios, Evaluation and Significance", C. Cozewith and G. VerStrate, Macromolecules, 4,482 (1971), which is incorporated herein by reference.

It is disclosed by the authors that copolymers made in a continuous flow stirred reactor should have an MWD characterized by $\overline{M}_w/\overline{M}_n = 2$ and a narrow Inter-CD when one active catalyst species is present. By a combination of fractionation and gel permeation chromatography (GPC) it is shown that for single active species catalysts the composition of the fractions vary no more than ±3% about the average and the MWD (weight to number average ratio) for these samples approaches two (2). It is this latter characteristic ($\overline{M}_w/\overline{M}_n$ of about 2) that is deemed the more important in identifying a single active catalyst species. On the other hand, other catalysts gave copolymer with an Inter-CD greater than ±10% about the average, and multimodal MWD with a $\overline{M}_w/\overline{M}_n$ value greater than about 2. These other catalysts are deemed to have more than one active species.

Catalyst systems to be used in carrying out processes in accordance with the present invention may be Ziegler copolymerization catalysts, which may typically include:

(a) a compound of a transition metal, i.e., a metal of Groups I-B, III-B, IVB, VB, VIB, VIIB, and VIII of the Periodic Table, and (b) an organometal compound of a metal of Groups I-A, II-A, II-B, and III-A of the Periodic Table.

The preferred catalyst system in practicing processes in accordance with the present invention comprises hydrocarbon-soluble vanadium compound in which the vanadium valence is 3 to 5 and organo-aluminum compound, with the provision that the catalyst system yields essentially one active catalyst species as described above. At least one of the vanadium compound/organo-aluminum pair selected must also contain a valence-bonded halogen.

In terms of formulas, vanadium compounds useful in practicing processes in accordance with the present invention could be:

(1)

where $x = 0-3$ and $R =$ a hydrocarbon radical;
$VCl_4$;
$VO(AcAc)_2$, where $AcAc =$ acetyl acetonate;
$V(AcAc)_3$;

(2)

where $x = 1$ or 2; and $VCl_3 \cdot nB$ where $n = 2-3$ and $B =$ Lewis base capable of making hydrocarbon-soluble complexes with $VCl_3$, such as tetrahydrofuran, 2-methyl-tetrahydrofuran and dimethyl pyridine.

In formula 1 above, R preferably represents a $C_1$ to $C_{10}$ aliphatic, alicyclic or aromatic hydrocarbon radical such as ethyl (Et), phenyl, isopropyl, butyl, propyl, n-butyl, i-butyl, t-butyl, hexyl, cyclohexyl, octyl, naphthyl, etc. Non-limiting illustrative examples of formula (1) and (2) compounds are vanadyl trihalides, alkoxy halides and alkoxides such as $VOCl_3$, $VOCl_2(OBu)$ where Bu=butyl, and $VO(OC_2H_5)_3$. The most preferred vanadium compounds are $VCl_4$, $VOCl_3$, and $VOCl_2(OR)$.

As already noted, the co-catalyst is preferably organo-aluminum compound. In terms of chemical formulas, these compounds could be as follows:

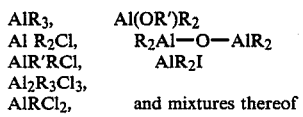

where R and R' represent hydrocarbon radicals, the same or different, as described above with respect to the vanadium compound formula. The most preferred organo-aluminum compound is an aluminum alkyl sesquichloride such as $Al_2Et_3Cl_3$ or $Al_2(iBu)_3Cl_3$.

In terms of performance, a catalyst system comprised of $VCl_4$ and $Al_2R_3Cl_3$, preferably where R is ethyl, has been shown to be particularly effective. For best catalyst performance, the molar amounts of catalyst components added to the reaction mixture should provide a molar ratio of aluminum/vanadium (Al/V) of at least about 2. The preferred minimum Al/V is about 4. The maximum Al/V is based primarily on the considerations of catalyst expense and the desire to minimize the amount of chain transfer that may be caused by the organo-aluminum compound (as explained in detail below). Since, as is known, certain organo-aluminum compounds act as chain transfer agents, if too much is present in the reaction mixture the $\overline{M}_w/\overline{M}_n$ of the copolymer may rise above 2. Based on these considerations, the maximum Al/V could be about 25; however, a maximum of about 17 is more preferred. The most preferred maximum is about 15.

Chain transfer agents for the Ziegler-catalyzed polymerization of alpha-olefins are well known and are illustrated, by way of example, by hydrogen or diethyl zinc for the production of EPM and EPDM. Such agents are very commonly used to control the molecular weight of EPM and EPDM produced in continuous flow stirred reactors. For the essentially single active species Ziegler catalyst systems used in accordance with the present invention, addition of chain transfer agents to a CFSTR reduces the polymer molecular weight but does not affect the molecular weight distribution. On the other hand, chain transfer reactions during tubular reactor polymerization in accordance with the present invention broaden polymer molecular weight distribution.

Chains which terminate prior to addition of the nonconjugated diene will not be coupled into the nodular structure. Thus, the presence of chain transfer agents in the reaction mixture should be minimized or omitted altogether. Although difficult to generalize for all possible reactions, the amount of chain transfer agent used should be limited to those amounts that provide copolymer product in accordance with the desired limits as regards MWD and compositional dispersity. It is believed that the maximum amount of chain transfer agent present in the reaction mixture could be as high as about 0.2 mol/mol of transition metal, e.g., vanadium, again provided that the resulting copolymer product is in accordance with the desired limits as regards MWD and compositional dispersity. Even in the absence of added chain transfer agent, chain transfer reactions can occur because propylene and the organo-aluminum co-catalyst can also act as chain transfer agents. In general, among the organo-aluminum compounds that in combination with the vanadium compound yield just one active species, the organo-aluminum compound that gives the highest copolymer molecular weight at acceptable catalyst activity should be chosen. Furthermore, if the Al/V ratio has an effect on the molecular weight of copolymer product, that Al/V should be used which gives the highest molecular weight also at acceptable catalyst activity. Chain transfer with propylene can best be limited by avoiding excessive temperature during the polymerization as described below.

Molecular weight distribution and Inter-CD are also broadened by catalyst deactivation during the course of the polymerization which leads to termination of growing chains. It is well known that the vanadium-based Ziegler catalysts used in accordance with the present invention are subject to such deactivation reactions which depend to an extent upon the composition of the catalyst. Although the relationship between active catalyst lifetime and catalyst system composition is not known at present, for any given catalyst, deactivation can be reduced by using the shortest residence time and lowest temperature in the reactor that will produce the desired monomer conversions.

When catalyst deactivation is occurring, the feed containing diene monomer is preferably added to the reactor at a point during the polymerization where at least 50% of the catalyst is still active. Polymerizations in accordance with the present invention should be conducted in such a manner and under conditions sufficient to initiate propagation of essentially all copolymer chains simultaneously. This can be accomplished by utilizing the process steps and conditions described below.

The catalyst components are preferably premixed, that is, reacted to form active catalyst outside of the reactor, to ensure rapid chain initiation. Aging of the premixed catalyst system, that is, the time spent by the catalyst components (e.g., vanadium compound and organo-aluminum) in each other's presence outside of the reactor, should preferably be kept within limits. If not aged for a sufficient period of time, the components will not have reacted with each other sufficiently to yield an adequate quantity of active catalyst species, with the result of nonsimultaneous chain initiation. Also, it is known that the activity of the catalyst species will decrease with time so that the aging must be kept below a maximum limit. It is believed that the minimum aging period, depending on such factors as concentration of catalyst components, temperature and mixing equipment could be as low as about 0.1 second.

The preferred minimum aging period is about 0.5 second, while the most preferred minimum aging period is about 1 second. The vanadium/organo-aluminum catalyst system can be aged indefinitely. While the maximum aging period could be higher, for the preferred vanadium/organo-aluminum catalyst system the preferred maximum is at least 500 seconds and possibly about 5000 seconds. A more preferred maximum is about 200 seconds. The most preferred maximum aging period is about 100 seconds. The premixing could be performed at a low temperature such as 40° C. or below. It is preferred that the premixing be performed at 25° C. or below, with 15° or below being most preferred.

The temperature of the reaction mixture should also be kept within certain limits. The temperature at the reactor inlet should be high enough to provide complete, rapid chain initiation at the start of the polymerization reaction. The length of time that the reaction mixture spends at high temperature must be short enough to minimize the amount of undesirable chain transfer and catalyst deactivation reactions.

Temperature control of the reaction mixture is complicated somewhat by the fact that the polymerization reaction generates large quantities of heat. This problem is, preferably, taken care of by using prechilled feed to the reactor to absorb the heat of polymerization. With this technique, the reactor is operated adiabatically and the temperature is allowed to increase during the course of polymerization. As an alternative to feed prechill, heat can be removed from the reaction mixture, for example, by a heat exchanger surrounding at least a portion of the reactor or by well-known autorefrigeration techniques in the case of batch reactors or multiple stirred reactors in series.

If adiabatic reactor operation is used, the inlet temperature of the reactor feed could be about from −50° C. to 140° C. It is believed that the outlet temperature of the reaction mixture could be as high as about 150° C. The preferred maximum outlet temperature is about 70° C. The most preferred maximum is about 50° C. In the absence of reactor cooling, such as by a cooling jacket, to remove the heat of polymerization, the temperature of the reaction mixture will increase from reactor inlet to outlet by an amount dependant on the heat of polymerization, reaction mixture specific heat, and the weight percent of copolymer in the reaction mixture. For ethylene-propylene copolymerization in hexane solvent the temperature rise is about 13 degrees C. per weight percent of copolymer formed.

Having the benefit of the above disclosure, it would be well within the skill of the art to determine the operating temperature conditions for making copolymer in accordance with the present invention. For example, assume an adiabatic reactor and an outlet temperature of 35° C. are desired for a reaction mixture containing 5% copolymer. The reaction mixture will increase in temperature by about 13° C. for each weight percent copolymer or 5 weight percent x 10° C./wt. %=50° C. To maintain an outlet temperature of 35° C., it will thus require a feed that has been prechilled to 35° C.−50° C.=−15° C. In the instance that external cooling is used to absorb the heat of polymerization, the feed inlet temperature could be higher with the other temperature constraints described above otherwise being applicable.

Because of heat removal and reactor temperature limitations, the preferred maximum copolymer concentration at the reactor outlet is 25 wt./100 wt. diluent. The most preferred maximum concentration is 15 wt./100 wt. There is no lower limit to concentration due to reactor operability, but for economic reasons, it is preferred to have a copolymer concentration of at least 2 wt./100 wt. Most preferred is a concentration of at least 3 wt./100 wt.

The rate of flow of the reaction mixture through the reactor should be high enough to provide good mixing of the reactants in the radial direction and minimize mixing in the axial direction. Good radial mixing is beneficial not only to both the Intra- and Inter-CD of the copolymer chains, but also to minimize radial temperature gradients due to the heat generated by the polymerization reaction. Radial temperature gradients will tend to broaden the molecular weight distribution of the copolymer, since the polymerization rate is faster in the high temperature regions resulting from poor heat dissipation. The artisan will recognize that achievement of these objectives is difficult in the case of highly viscous solutions. This problem can be overcome to some extent through the use of radial mixing devices such as static mixers (e.g., those produced by the Kenics Corporation).

It is believed that residence time of the reaction mixture in the mix-free reactor can vary over a wide range. It is believed that the minimum could be as low as about 1 second. A preferred minimum is about 10 seconds. The most preferred minimum is about 15 seconds. It is believed that the maximum could be as high as about 3600 seconds. A preferred maximum is about 1800 seconds. The most preferred maximum is about 900 seconds.

With reference to the accompanying drawings, particularly FIG. 1, reference numeral 1 generally refers to a premixing device for premixing the catalyst components. For purposes of illustration, it is assumed that the copolymer of ethylene and propylene (EPM) is to be produced using as catalyst components vanadium tetrachloride and ethyl aluminum sesquichloride. The polymerization is an adiabatic, solution polymerization process using hexane solvent for both the catalyst system and the reaction mixture.

The premixing device 1 comprises a temperature control bath 2, a fluid flow conduit 3 and mixing device 4 (e.g., a mixing tee). To mixing device 4 are fed hexane solvent, vanadium tetrachloride and ethyl aluminum sesquichloride through feed conduits 5, 6 and 7, respectively. Upon being mixed in mixing device 4, the resulting catalyst mixture is caused to flow within conduit 3, optionally in the form of a coiled tube, for a time long enough to produce the active catalyst species at the temperature set by the temperature bath. The temperature of the bath is set to give the desired catalyst solution temperature in conduit 3 at the outlet of the bath.

Upon leaving the premixing device, the catalyst solution flows through conduit 8 into mixing zone 9 to provide an intimate mixing with hexane solvent and reactants (ethylene and propylene) which are fed through conduit 10. Any suitable mixing device can be used, such as a mechanical mixer, orifice mixer or mixing tee. For economic reasons, the mixing tee is preferred. The residence time of the reaction mixture in mixing zone 9 is kept short enough to prevent significant polymer formation therein before being fed through conduit 11 to the first section of the tubular reactor, 12. Alternatively, streams 8 and 10 can be fed directly to the inlet of reactor 12 if the flow rates are high enough to accomplish the desired level of intimate mixing. The hexane with dissolved monomers may be cooled upstream of mixing zone 9 to provide the desired feed temperature at the reactor inlet.

At the outlet of the tubular reactor, A, the polymer solvent and unreacted monomer enter mixer 13 through inlet line 14, where the diene and, optionally, additional monomers are introduced. After mixing, the polymer solution and additional monomer feed pass into the second stage of the tubular reactor, 15, where polymerization continues. For Ziegler copolymerizable dienes or dienes coupled by cationic catalysts, coupling to form the nodular polymer of this invention may also occur in reactor 15. The polymer/solvent mixture with unreacted monomer exits the reactor, 15, at point B, where it is collected for treatment and recovery. If the polymer remains uncoupled at point B such treatment includes the addition of suitable crosslinking agents to form the nodular polymer. While the reactor can be operated adiabatically, if desired or necessary to maintain the reaction mixture temperature within desired limits, external cooling means such as a cooling jacket surrounding at least a portion of the reactor system, 12, and 15, can be provided.

Figure 5:
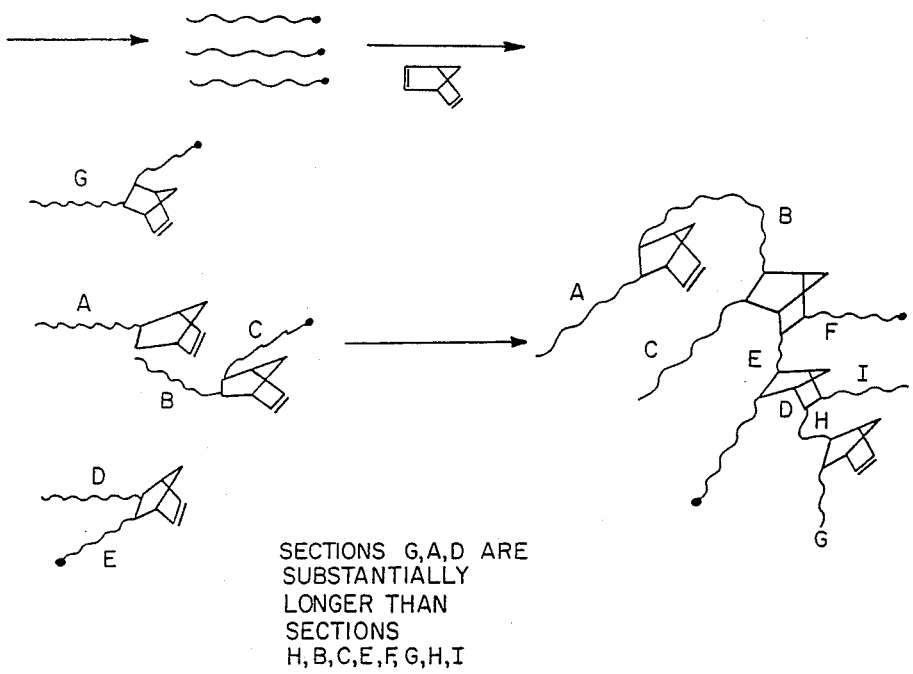
FIG. 5 is a schematic representation of the formation of the nodular polymers.
Figure 6:
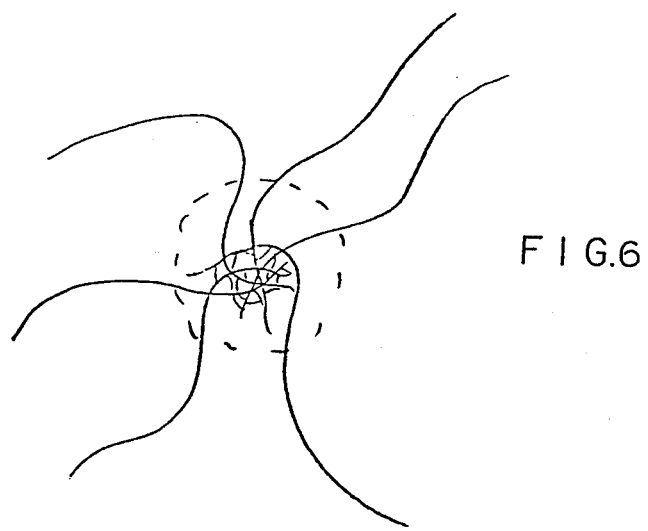
FIG. 6 illustrates the nodular copolymer which is formed.

In one embodiment, the process of this invention is carried out by beginning the polymerization of the poly co(ethylene-propylene) which is permitted to grow to a molecular weight of several tens of thousands, e.g., 10,000 to 50,000 number average molecular weight. The polymerization of the copolymer will generally have proceeded to about 50% of the total anticipated weight of polymer at the end of polymerization, more preferably at least 70% of the total weight; at that point in time, the diene monomer, and optionally, a cationic catalyst if the diene is subject to cationically catalyzed coupling are introduced into the reactor with or without additional ethylene and propylene. With Ziegler copolymerizable dienes the polymer copolymerizes with the double bonds of the diene monomer to form the nodular polymers of this invention. This diolefin copolymerizes at the chain ends coupling several chains, as illustrated schematically in FIG. 5. Alternatively, coupling agent may be added at the entrance to the tubular reactor with a part of the ethylene and alpha-olefin monomer, polymerization being carried out until nodules are formed and the coupling agent is substantially converted; then additional ethylene and alpha-olefin are added to grow nodular polymers of this invention.

Figure 2:
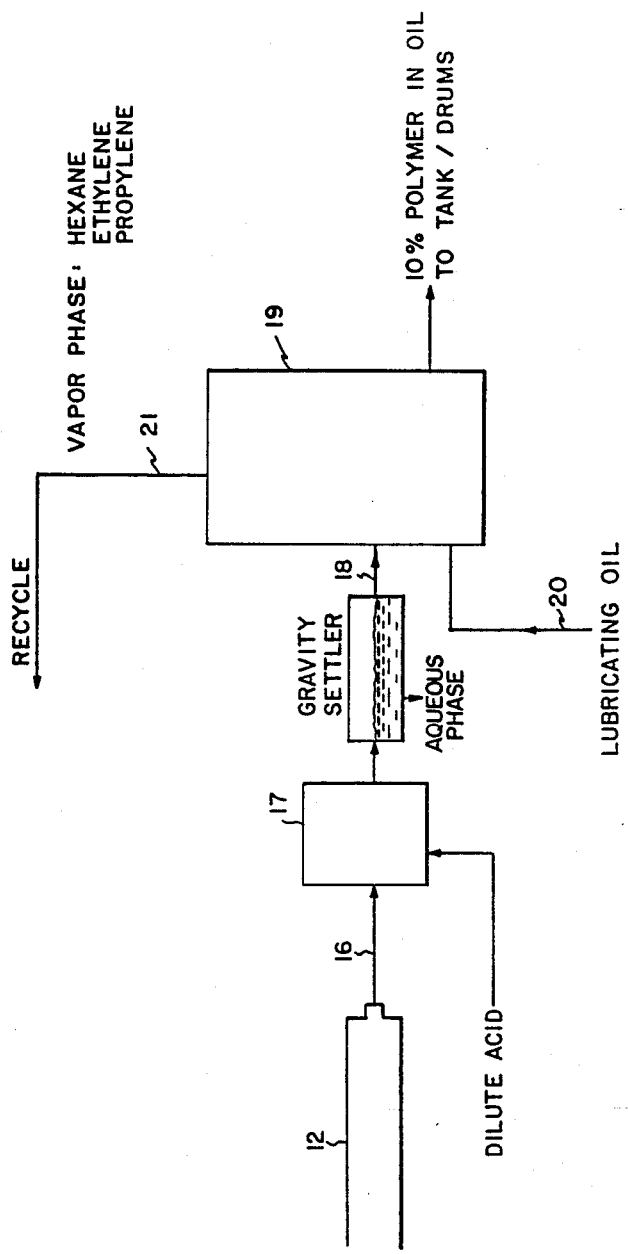
FIG. 2 schematically illustrates how the process depicted in FIG. 1 can be integrated into a lube oil additive process.

With reference to FIG. 2, which schematically illustrates a process for mixing nodular copolymer with lube oil, a nodular copolymer product from reactor 15 is fed through conduit 16 to deashing section 17, wherein catalyst residues are removed from the reaction mixture in a known manner (known as deashing). The vanadium and aluminum compound residues are removed by reacting them with water to form hydrocarbon-isoluble hydroxides, and then extracting the hydroxides into dilute acid.

After separating the aqueous and hydrocarbon phases, for instance in a gravity settler, the polymer solution, which primarily contains solvent, unreacted monomers and copolymer product (EPM), is fed through conduit 18 to lube oil mixing tank 19. Of course, tank 19 could be a staged series of tanks. Hot lube oil is fed through conduit 20 to mixing tank 19, wherein the remaining reaction mixture is heated up such that the remaining hexane and unreacted monomers are vaporized and removed through recycle conduit 21, through which they flow back for reuse in premixing device 1 following suitable purification, to remove any catalyst poisons. The copolymer product, being hydrocarbon-soluble, is now present in the lube oil and is removed from tank 19 as a copolymer-in-oil solution.

Alternatively, the copolymer solution from the gravity settler can be stream distilled with subsequent extrusion drying of the polymer, and then mixed with a hydrocarbon mineral oil diluent to produce an oil additive concentrate or lube oil additive.

Having thus described the above illustrative reactor system, it will readily occur to the artisan that many variations can be made within the scope of the present invention. For example, the placement and number of multiple feed sites, the choice of temperature profile during polymerization, and the concentrations of reactants can be varied to suit the end-use application.

By practicing processes in accordance with the present invention, alpha-olefin copolymers having very narrow MWD can be made by direct polymerization and coupled to form nodular polymers.

A lubricating oil composition in accordance with the present invention comprises a major amount of basestock lubricating oil (lube oil) of lubricating viscosity which contains an effective amount of Viscosity Index improver being a nodular copolymer of ethylene and at least one other alpha-olefin, as described in detail above. More specifically, the chains coupled to form the nodular copolymer should have a MWD characterized by at least one of a ratio of $\overline{M}_w/\overline{M}_n$ of less than 2 and a ratio of $\overline{M}_z/\overline{M}_w$ of less than 1.8. The preferred ratio of $\overline{M}_w/\overline{M}_n$ is less than about 1.6, with less than about 1.4 being preferred. The preferred $\overline{M}_z/\overline{M}_w$ is less than about 1.5, with less than about 1.3 being most preferred.

In one embodiment of the invention, the Intra-CD of the copolymer is such that at least two portions of an individual intramolecularly hetrogeneous chain, each portion comprising at least 5 weight percent of the chain, differ in composition from one another by at least 5 weight percent ethylene. The Intra-CD can be such that at least two portions of copolymer chain differ by at least 10 weight percent ethylene. Difference of at least 20 weight percent, as well as 40 weight percent ethylene, are also considered to be in accordance with the present invention.

In another embodiment of the invention, the Inter-CD of the copolymer is such that 95 wt. % of the copolymer chains have an ethylene composition that differs from the copolymer average weight percent ethylene composition by 15 wt. % or less. The preferred Inter-CD is about 13% or less, with the most preferred being about 10% or less.

In a particular embodiment, the copolymer has all of the MWD, Intra-CD and Inter-CD characteristics described above when incorporated in a lubricating oil or oil additive concentrate composition. In current practice, ethylenepropylene copolymer is most preferred. The preferred ethylene content of the copolymer, on a weight basis, for use as a lube oil additive is about from 30% to 75%.

For lube oil additive applications, it is believed that the copolymer could have a weight average molecular weight as low as about 2,000. The preferred minimum is about 15,000, with about 50,000 being the most preferred minimum. It is believed that the maximum weight average molecular weight could be as high as about 12,000,000. The preferred maximum is about 300,000, with about 250,000 being the most preferred maximum. The preferred ethylene content is 30% to 75%.

The nodular copolymers of this invention may be employed in lubricating oils as Viscosity Index improvers or viscosity modifiers in amounts varying broadly from about 0.001 to 49 wt. %. The proportions giving the best results will vary somewhat according to the nature of the lubricating oil basestock and the specific purpose for which the lubricant is to serve in a given case. When used as lubricating oils for diesel or gasoline engine crankcase lubricants, the polymer concentrations are within the range of about 0.1 to 15.0 wt. % of the total composition, which are amounts effective to provide Viscosity Index improvements. Typically, such polymeric additives are sold as oil additive concentrates wherein the additive is present in amounts of about 5 to 50 wt. %, preferably 6 to 25 wt. % based on the total amount of hydrocarbon mineral oil diluent for the additive. The polymers of this invention are typically used in lubricating oils based on a hydrocarbon mineral oil having a viscosity of about 2–40 centistokes (ASTM D-445) at 99° C.; however, lubricating oil basestocks comprised of a mixture of a hydrocarbon mineral oil and up to about 25 wt. % of a synthetic lubricating oil, such as esters of dibasic acids and complex esters derived from monobasic acids, polyglycols, dibasic acids and alcohols, are also considered suitable.

The novel compositions of this invention comprise about .05 to about 25 mol % coupling agent based on the total nodular polymer, preferably about 0.1 to about 15 mol %, more preferably about 0.15 to about 10 mol %. In the process for preparing the nodular copolymer, the coupling agent is preferably utilized in the reaction mixture at about 0.1 to about 80 wt. % based on the total monomer, more preferably about 0.5 to about 50 wt. %. The most preferred range is 2% to 20%.

The novel process to form the nodular polymers of this invention may be more readily appreciated by reference to the following examples.

EXAMPLE 1

Solution polymerization of ethylene, propylene and norbornadiene was carried out in a tubular reactor with VCl$_4$ catalyst and Al$_2$Et$_3$Cl$_3$ (EASC) cocatalyst as the catalyst system. Norbornadiene (NBD) is a Ziegler copolymerizable diene that yields a nodular copolymer in the presence of the VCl$_4$/EASC catalyst system. The polymerization equipment is shown in FIG. 1. The catalyst and co-catalyst were premixed as dilute solutions in hexane for about 6 sec. at 0° C. The catalyst was combined with chilled hexane, ethylene, and propylene at a temperature of −10° C. in mixing zone 9. The reaction mixture then entered reactor 12. At point 13 along the reactor, norbornadiene was fed dissolved in hexane with varying amounts of ethylene through line 14. The reactor residence time was 40 sec. The polymerization was conducted adiabatically to give a reactor outlet temperature of about 40° C.

The polymerization was terminated by quenching the catalyst with water and the polymer was recovered from solution by steam stripping to remove the hexane followed by drying the polymer on a hot rubber mill. Characteristics of the polymerization prior to point 13 were measured by removing small polymer solution samples and determining the polymer concentration.

As shown by the results 1A, 1B and 1C in Table I, increasing the ethylene feed rate at point 13 increases the NBD content of the polymer and thereby the amount of chain coupling as measured by the increase in Mooney viscosity (ML) and bulk viscosity (No). The viscosity ratio, which measures the amount of chain coupling by comparing the viscosity of the branched and an unbranched copolymer of the same $\overline{M}_w$, also increases substantially.

EXAMPLE 2

The procedure of Example 1 was repeated except ethylidene norbornene (ENB) was added at point 13. ENB is a cross-linkable diene that gives chain coupling in the presence of a Lewis acid such as EASC which is present as part of the catalyst system. As shown in Table I, the nodular polymer produced has an enhanced viscosity ratio.

EXAMPLE 3

Polymerization in a tubular reactor is carried out with VCl$_4$ catalyst and diisobutyl aluminum chloride (DIBAC) cocatalyst as the catalyst system. The components are premixed for 1 sec. at 0° C. and combined with a hexane, ethylene, and propylene solution at 0° C. at the reactor inlet. ENB, ethylene, and hexane are fed at point 13 along the reactor to form a second chain segment containing coupling agent. Feed rates are shown in Table I. The polymer solution exiting the reactor is substantially uncoupled. The solution is subjected to reduced pressure to strip off most of the unreacted monomers and then a solution of ethyl aluminum dichloride, a Lewis acid catalyst, is added to couple the chains by crosslinking. The product is recovered by aqueous deashing to remove catalyst residues followed by steam stripping to remove the solvent, and extrusion drying of the polymer.

EXAMPLE 4

The procedure of Example 3 is repeated in a tubular reactor containing two additional inlets downstream of the point 13 shown in FIG. 1. An additional monomer feed of 50 g/hr of ethylene dissolved in hexane is added at the first of these inlets to increase the extent of ENB incorporation into the growing copolymer chains, and the polymerization is allowed to proceed until substantially all of the ENB is converted. A feed of 100 g/hr of ethylene, 500 g/hr propylene and 6 l/hr of hexane is fed at the second inlet to form a chain segment containing essentially only ethylene and propylene. The polymer exiting the reactor is substantially uncrosslinked and has a narrow MWD characterized by $\overline{M}_w/\overline{M}_n = 1.5$. The chains consist of an initial and final section containing only ethylene and propylene and a central section containing ENB. A nodular copolymer is produced by the procedure described in Example 3.

EXAMPLE 5

Polymerization in a tubular reactor is carried out with VCl$_4$ catalyst and EASC cocatalyst as the catalyst system, premixed as described in Example 1. The catalyst stream is combined at the reactor inlet with a monomer feed of ethylene, propylene, and vinyl norbornene dissolved in hexane. Vinyl norbornene is a Ziegler copolymerizable diene that produces coupled chains in the presence of the catalyst system. Feed rates are as shown in Table I. After a reaction time sufficient to produce high diene conversion, ethylene, propylene and additional hexane are added at point 13 along the reactor. The polymerization is quenched with water at the end of the reactor and the polymer is recovered by usual means. The product is a nodular copolymer having a high viscosity ratio.

EXAMPLE 6

Polymerization of monomer is carried out as described in Example 3 to produce a solution of uncoupled polymer chains. This solution is fed to an agitated vessel maintained at 25° C. temperature along with SCl$_2$. The SCl$_2$ feed rate is set at 1.2 mol/mol of double bonds available in the polymer. Chain coupling takes place in a residence time of 10 minutes. The polymer is recovered from the solution by steam stripping and extrusion drying to yield a nodular copolymer product.

EXAMPLE 7

The polymerization of Example 3 is repeated except isopropylidene norbornene is fed to the reactor instead of ENB and the feed rates are as shown in Table I. The polymer chains leaving the reactor are substantially uncoupled. The polymer is recovered from solution by steam stripping followed by extrusion drying. The dried polymer is compounded with 0.5 phr of t-butyl peroxide free radical catalyst and subjected to a temperature of 100° C. for 60 minutes. The resulting polymer is a nodular branched copolymer soluble in lubricating oils.

Although the invention is described with reference to particular means, materials, and processes, the invention is not limited except by the scope of the claims.

What is claimed is:

1. A nodular ethylene -alpha-olefin copolymer product of copolymer chains having at least one of $\overline{M}_w/\overline{M}_n$ less than 2 and $\overline{M}_z/\overline{M}_w$ less than 1.8, comprising a nodule region of substantial cross-linking of copolymer chain second segments, with substantially uncross-linked copolymer chain first segments extending therefrom.

2. The nodular copolymer as defined by claim 1 wherein said nodule region contains less than 50% by weight of said copolymer.

3. The nodular copolymer as defined by claim 1 wherein said copolymer chains have $\overline{M}_w/\overline{M}_n$ less than 2 and $\overline{M}_z/\overline{M}_w$ less than 1.8.

4. The nodular copolymer as defined by claim 1 wherein said chain first segments have $\overline{M}_w/\overline{M}_n$ less than 2 and $\overline{M}_z/\overline{M}_w$ less than 1.8.

5. The nodular copolymer as defined by claim 1 wherein said copolymer chains have a weight average molecular weight of about 2,000-12,000,000.

6. The nodular copolymer as defined by claim 5 wherein said copolymer chains have a weight average molecular weight of at least 10,000.

7. The nodular copolymer as defined by claim 1 wherein the intra-CD is such that at least two portions of each of said copolymer chains, each portion comprising at least 5 weight percent of the chain, differ in composition from one another by at least 5 weight percent ethylene.

8. The nodular copolymer as defined by claim 7 wherein the inter-CD of said copolymer chains is such that 95 weight percent of said copolymer chains have an ethylene composition that differs from the average weight percent ethylene composition by 15% or less.

9. The nodular copolymer as defined by claim 1 further comprising additional polymer chains, said copolymer chains constituting greater than 50% by weight of the total of said polymer and copolymer chains in said nodule.

10. The nodular copolymer as defined by claim 1 wherein said chain first segments, being in the form of one contiguous segment or a plurality of discontinuous segments, comprise a copolymer of ethylene and an alpha-olefin; and said chain second segments comprised a copolymer of ethylene, an alpha-olefin, and a Ziegler copolymerizable diene, said second segments constituting less than 50% by weight of each copolymer chain formed by said first and second segments, said second segments being in the form of one contiguous segment or a plurality of discontinuous segments.

11. The nodular copolymer as defined by claim 10 wherein said Ziegler copolymerizable diene is selected from the group consisting of norbornadiene, vinyl norbornene, and butenyl norbornene.

12. The nodular copolymer as defined by claim 1 wherein said chain first segments, being in the form of one contiguous segment or a plurality of discontinuous segments, comprise a copolymer of ethylene and an alpha-olefin; and said chain second segments comprised a copolymer of ethylene, an alpha-olefin, and a cross-linkable diene, said second segments constituting less than 50% by weight of each copolymer chain formed by said first and second segments, said second segments being in the form of one contiguous segment or a plurality of discontinuous segments.

13. The nodular copolymer as defined by claim 12 wherein said cross-linkable diene is selected from the group consisting of ENB; 1, 4-hexadiene; and dicyclopentadiene.

14. The nodular copolymer as defined by claim 1 wherein said copolymer chain first segments, being in the form of one contiguous segment, comprise a copolymer of ethylene and alphaolefin, and said copolymer second segments, being in the form of one contiguous segment, comprise a copolymer of ethylene, and alpha-olefin, and a coupling agent.

15. The nodular copolymer as defined by claim 14 wherein the inter-CD of said copolymer chains is such that 95 weight percent of said copolymer chains have an ethylene composition that differs from the average weight percent ethylene composition by 15% or less.

16. The nodular copolymer as defined by claim 15 wherein the intra-CD is such that at least two portions of each of said copolymer chains, each portion comprising at least 5 weight percent of the chain, differ in composition from one another by at least 5 weight percent ethylene.

17. A process of forming a nodular ethylene - alpha-olefin copolymer product comprising a nodule region of substantial cross-linking of chain second segments, with substantially uncross-linked chain first segments extending therefrom, comprising reacting copolymer chains containing:

(a) a first segment in the form of one contiguous segment or a plurality of discontinuous segments comprising a copolymer of ethylene and an alpha-olefin; and (b) a second segment comprising a copolymer of ethylene, an alpha-olefin and a coupling agent, said second segment constituting less than 50 percent by weight of said copolymer chain, said second segment being in the form of one contiguous segment or a plurality of discontinuous segments;

said coupling agent being cross-linkable under conditions which do not cross-link said first segment to any substantial extent, to form said nodular copolymer, said copolymer chains having at least one of $\overline{M}_w/\overline{M}_n$ less than 2 and $\overline{M}_z/\overline{M}_w$ less than 1.8.

18. The process as defined by claim 17 wherein said nodule region contains less than 50% by weight of said nodular copolymer.

19. The process as defined by claim 17 further comprising cross-linking said second segments to form said nodule region.

20. The process as defined by claim 17 wherein said copolymer chains have $\overline{M}_w/\overline{M}_n$ less than 2 and $\overline{M}_z/\overline{M}_w$ less than 1.8.

21. The process as defined by claim 17 wherein said copolymer chains have a weight average molecular weight of about 2,000–12,000,000.

22. The process as defined by claim 21 wherein said copolymer chains have a weight average molecular weight of at least 10,000.

23. The process as defined by claim 17 wherein the intra-CD is such that at least two portions of said polymer chains, each portion comprising at least 5 weight percent of the chain, differ in composition from one another by at least 5 weight percent ethylene.

24. The process as defined by claim 23 wherein the inter-CD of said copolymer chains is such that 95 weight percent of said copolymer chains have an ethylene composition that differs from the average weight percent ethylene composition by 15% or less.

25. The process as defined by claim 17 further comprising incorporating additional polymer chains constituting less than 50% by weight of said nodular copolymer.

26. The process as defined by claim 17 comprising the step of catalyzing the cross-linking of said coupling agent with cationic catalyst.

27. The process as defined by claim 17 comprising the step of catalyzing the cross-linking of said coupling agent with a free radical catalyst.

28. The process as defined by claim 27 wherein said free radical catalyst is a peroxide selected from the group consisting of: dicumyl peroxide, di-tertiary butyl peroxides, t-butylperbenzoate, 1,1 di(t-butylperoxy) 3,3,5 trimethyl cyclohexane, and mixtures thereof.

29. The process as defined by claim 17 comprising the step of catalyzing the cross-linking of said coupling agent with an olefin coupling agent.

30. The process as defined by claim 17 wherein said coupling agent is a Ziegler copolymerizable diene.

31. The process as defined by claim 30 wherein said Ziegler copolymerizable diene is selected from the group consisting of norbornadiene, vinyl norbornene, and butenyl norbornene.

32. The process as defined by claim 17 wherein said coupling agent is a cross-linkable diene.

33. The process as defined by claim 32 wherein said cross-linkable diene is selected from the group consisting of ENB;1,4-hexadiene; and dicyclopentadiene.

34. A polymerization process for producing a copolymer chain comprising:
(a) a first segment comprising one contiguous segment or a plurality of discontinuous segments of a copolymer of ethylene and an alpha-olefin; and
(b) a second segment comprising a copolymer of ethylene, an alphaolefin and a coupling agent, said second segment constituting less than 50% by weight of said copolymer chain, said second segment being in the form of one contiguous segment or a plurality of discontinuous segments on a given chain;
said coupling agent being cross-linkable under conditions which do not cross-link said first segment to any substantial extent, said process comprising:
polymerizing a reaction mixture of ethylene and alpha-olefin until the weight of said ethylene-alpha-olefin copolymer has reached at least 50% of the anticipated polymer weight at completion of polymerization so as to form said first segment, and then incorporating said coupling agent to form said second segment;
wherein said reaction mixture comprises a plurality of said copolymer chains, and said process further comprises cross-linking the second segments of said plurality of said copolymer chains to form a nodule.

35. The process as defined by claim 34 comprising polymerizing said ethylene, alpha olefin, coupling agent reaction mixture with essentially one catalyst species in at least one mix-free tubular reactor in such a manner and under conditions sufficient to initiate propagation of substantially all the copolymer chains simultaneously to form said plurality of said copolymer chains, wherein the copolymer chains are dispersed within the reaction mixture, and wherein said reaction mixture is essentially transferagent free.

36. The process as defined by claim 34 wherein said copolymer chains have at least one of $\overline{M}_w/\overline{M}_n$ less than 2 and $\overline{M}_z/\overline{M}_w$ less than 1.8.

37. The process as defined by claim 34 wherein said copolymer chains have $\overline{M}_w/\overline{M}_n$ less than 2 and $\overline{M}_z/\overline{M}_w$ less than 1.8.

38. The process as defined by claim 34 wherein said chain first segments have $\overline{M}_w/\overline{M}_n$ less than 2.

39. The process as defined by claim 34 wherein said plurality of copolymer chains have a weight average molecular weight of about 2,000–12,000,000.

40. The process as defined by claim 39 wherein said plurality of copolymer chains have a weight average molecular weight of at least 10,000.

41. The process as defined by claim 34 wherein the inter-CD is such that 95 weight percent of said copolymer chains have an ethylene composition that differs from the average weight percent ethylene composition by 15% or less.

42. The process as defined by claim 34 wherein the intra-CD is such that at least two portions of each chain, each portion comprising at least 5 weight percent of the chain differ in composition from one another by at least 5 weight percent ethylene.

43. The process as defined by claim 34 in combination with additional polymer chains, said plurality of copolymer chains constituting greater than 50% by weight of the total of said polymer and copolymer chains.

44. The process as defined by claim 34 comprising the step of catalyzing the cross-linking of said coupling agent with cationic catalyst.

45. The process as defined by claim 34 comprising the step of catalyzing the cross-linking of said coupling agent with a free radical catalyst.

46. The process as defined by claim 34 comprising the step of catalyzing the cross-linking of said coupling agent with an olefin coupling agent.

47. The process as defined by claim 34 wherein said coupling agent is a Ziegler copolymerizable diene.

48. The process as defined by claim 47 wherein said Ziegler copolymerizable diene is selected from the group consisting of norbornadiene, vinyl norbornene, and butenyl norbornene.

49. The process as defined by claim 34 wherein said coupling agent is a cross-linkable diene.

50. The process as defined by claim 49 wherein said cross-linkable diene is selected from the group consisting of ENB;1,4-hexadiene; and dicyclopentadiene.

51. A lubricating oil composition comprising an effective amount of a nodular copolymer additive according to claim 1, or produced by the process of any of claims 17 or 34.

* * * * *

UNITED STATES PATENT AND TRADEMARK OFFICE
CERTIFICATE OF CORRECTION

PATENT NO. : 4,882,406

DATED : Nov. 21,1989

INVENTOR(S) : C. COZEWITH et al

It is certified that error appears in the above-identified patent and that said Letters Patent is hereby corrected as shown below:

column 1, lines 63 and 64, change "$\overline{\sum NiMi} \over \sum NiMi$" to —$\overline{\sum NiMi} \over \sum Ni$—;

column 1, lines 65 and 66, change "$\overline{\sum NiMi^3} \over \sum NiMi$" to —$\overline{\sum NiMi^3} \over \sum NiMi^2$—;

column 4, line 66, change "a of" to ---of a---;

column 6, line 22, insert ---point--- after "pour";

column 9, line 19, change "This" to ---this---;

column 9, line 23, insert ---point--- after "pour";

column 9, line 39, change "indexes" to ---index---;

column 10, line 5, change "The" to ---the---;

column 16, line 8, change "at" to ---At---;

column 16, line 8, change "dien" to ---diene---;

column 16, line 9, change "ot" to ---of---;

column 17, line 56, change "is" to ---in--- after "difference";

UNITED STATES PATENT AND TRADEMARK OFFICE
CERTIFICATE OF CORRECTION

PATENT NO. : 4,882,406

DATED : Nov. 21, 1989

INVENTOR(S) : C. COZEWITH et al.

It is certified that error appears in the above-identified patent and that said Letters Patent is hereby corrected as shown below:

column 19, line 11, change "fragment" to ---fragments---;

column 20, line 17, change "chromtograph" to ---chromatograph---;

column 20, line 22, change "Chromtography" to ---Chromatography---;

column 20, line 64, delete ";3,7-dimethyl-1,7-Octadine";

column 20, line 68, change "1,5-cyclooctoadiene" to ---1,5-cyclooctadiene---;

column 22, line 18 change "isoctane" to ---isooctane---;

column 22, line 19, change "dichlorethane" to ---dichloroethane---;

column 27, line 2, insert ---C.--- after "15°";

column 30, line 25, change "hetrogeneous" to ---

UNITED STATES PATENT AND TRADEMARK OFFICE
CERTIFICATE OF CORRECTION

PATENT NO. : 4,882,406

DATED : Nov. 21, 1989

INVENTOR(S) : C. COZEWITH

It is certified that error appears in the above-identified patent and that said Letters Patent is hereby corrected as shown below:

heterogeneous---;

column 34, line 23, in claim 14, change "alphaolefin" to ----alpha-olefin---;

column 35, line 53, in claim 34 change "alphaolefin" to ----alpha-olefin---;

column 36, line 7, in claim 35 change "alpha olefin" to ----alpha-olefin---; and column 36, line 15, in claim 35 change "transferagent" to ----transfer-agent---.

Signed and Sealed this

Fourteenth Day of July, 1992

Attest:

DOUGLAS B. COMER

Attesting Officer      Acting Commissioner of Patents and Trademarks